US011119052B2

(12) United States Patent
Liu et al.

(10) Patent No.: US 11,119,052 B2
(45) Date of Patent: Sep. 14, 2021

(54) DYNAMIC BACKLIGHTING SYSTEM AND METHOD FOR INSPECTING A TRANSPARENCY

(71) Applicant: The Boeing Company, Chicago, IL (US)

(72) Inventors: Xue Liu, Maryland Heights, MO (US); Matthew Mark Thomas, Maryland Heights, MO (US); Hui Lin Yang, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/702,409

(22) Filed: Dec. 3, 2019

(65) Prior Publication Data

US 2021/0164920 A1 Jun. 3, 2021

(51) Int. Cl.
*G01N 21/958* (2006.01)
*G01N 21/88* (2006.01)
*B60Q 3/208* (2017.01)

(52) U.S. Cl.
CPC ....... *G01N 21/958* (2013.01); *G01N 21/8806* (2013.01); *B60Q 3/208* (2017.02); *G01N 2021/9586* (2013.01)

(58) Field of Classification Search
None
See application file for complete search history.

(56) References Cited

U.S. PATENT DOCUMENTS

| 4,461,570 | A | 7/1984 | Task |
| 5,343,288 | A | 8/1994 | Cohen |
| 5,479,276 | A | 12/1995 | Herbermann |
| 6,208,412 | B1 | 3/2001 | Ladewski |
| 7,365,838 | B2 | 4/2008 | Jones |
| 7,862,207 | B2 * | 1/2011 | Baldwin ............ G01N 21/9501 362/249.07 |
| 8,917,312 | B1 | 12/2014 | Gleason et al. |
| 2006/0092276 | A1 | 5/2006 | Ariglio |
| 2009/0251917 | A1 | 10/2009 | Wollner |

* cited by examiner

*Primary Examiner* — Michelle M Iacoletti

(57) ABSTRACT

An inspection system for detecting optical defects in a transparency includes a first rounded array of first elongated light elements, and a second rounded array of second elongated light elements. The second rounded array is positionable radially outboard of the first rounded array. The inspection system further includes a light-element-moving system configured to radially translate at least the first elongated light elements. The inspection system also includes an image recording device positionable on a side of the transparency opposite the first and second rounded arrays and configured to record images of the transparency during radial translation of at least the first elongated light elements during backlighting of the transparency. The inspection system includes a processor configured to analyze the images recorded during radial translation of at least the first elongated light elements, and detect optical defects in the transparency based on analysis of the images.

26 Claims, 36 Drawing Sheets

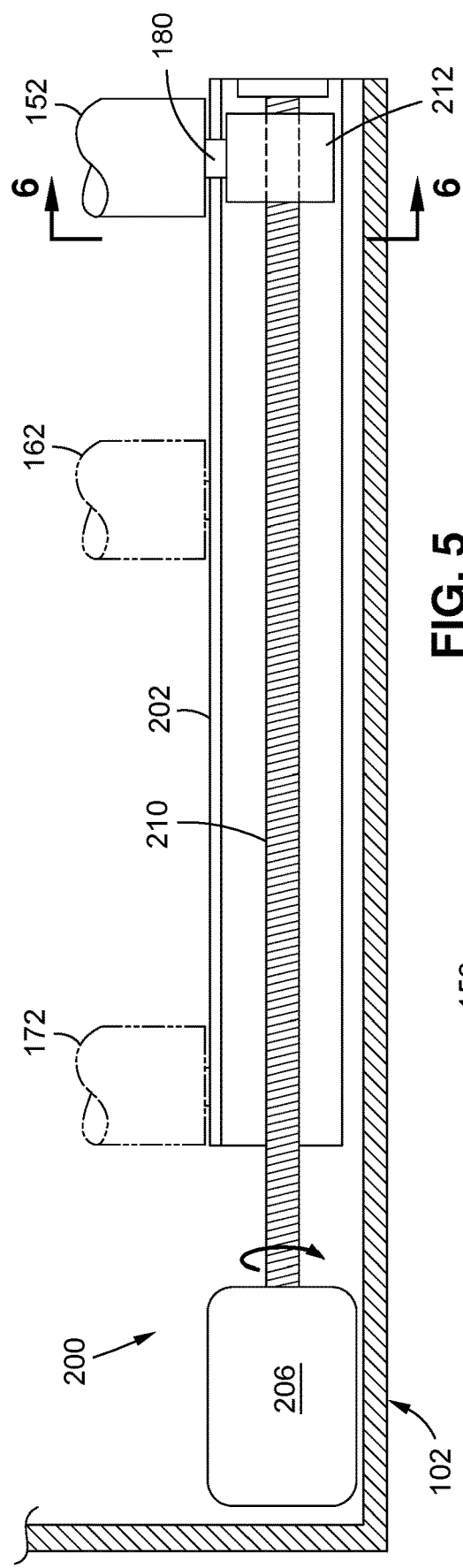
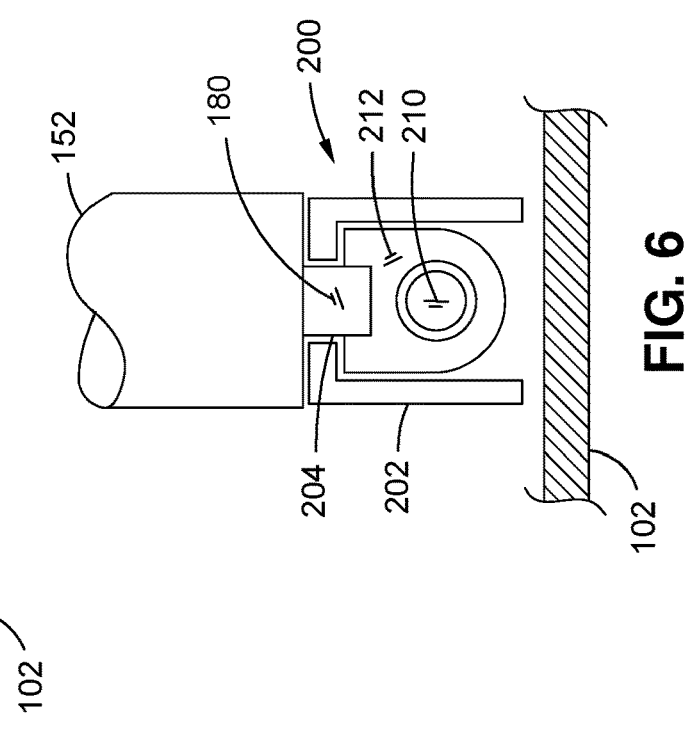
FIG. 5
FIG. 6

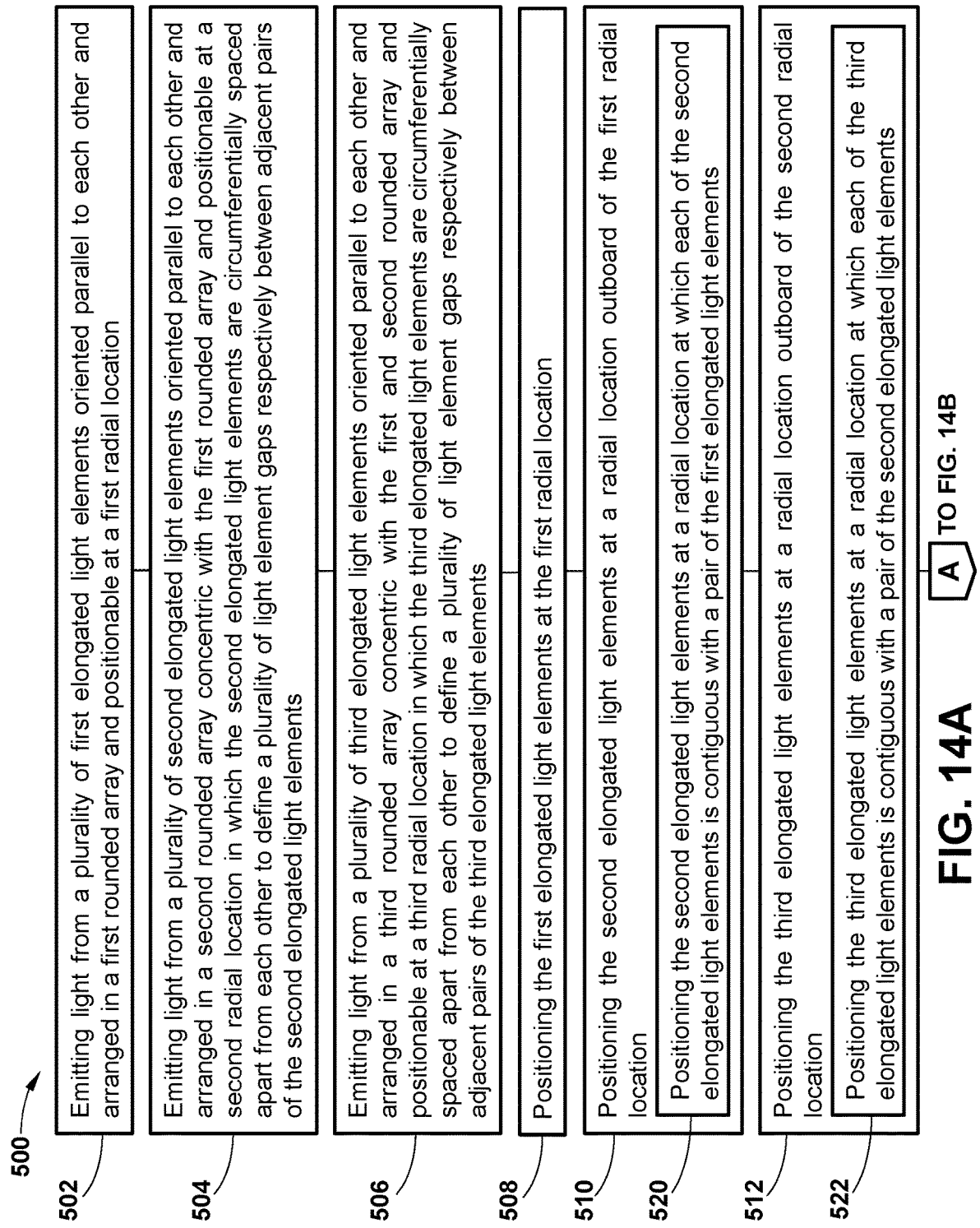

A | FROM FIG. 14A

514 — Radially translating the first elongated light elements between the first radial location and the second radial location 524 — Radially translating the first and second elongated light elements from the first radial location to the second radial location until each of the first elongated light elements is positioned within one of the light element gaps between adjacent ones of the second elongated light elements 526 — Radially translating the first elongated light elements from the first radial location to the second radial location at which each of the first elongated light elements is positioned within one of the light element gaps between adjacent ones of the second elongated light elements 528 — Radially translating the first elongated light elements from the first radial location to the second radial location until each of the third elongated light elements is contiguous with one of the first elongated light elements and one of the second elongated light elements 530 — Radially translating the first and second elongated light elements from the second radial location to the third radial location until each of the first and second elongated light elements is positioned within one of the light element gaps between adjacent ones of the third elongated light elements 532 — Radially translating the first, second, and third elongated light elements toward the third radial location until each of the first and second elongated light elements is positioned within one of the light element gaps between adjacent ones of the third elongated light elements

524 — Radially translating the first and second elongated light elements toward the third radial location

534 — Radially translating the first, second, and third elongated light elements at a same velocity toward the third radial location until each of the first and second elongated light elements is positioned within one of the light element gaps between adjacent ones of the third elongated light elements

536 — Radially translating the first, second, and third elongated light elements at different velocities toward the third radial location in a manner such that the first, second, and third elongated light elements arrive at the third radial location at the same time and each of the first and second elongated light elements is positioned within one of the light element gaps between adjacent ones of the third elongated light elements

538 — Radially translating the first, second, and third elongated light elements toward the third radial location at which each of the first and second elongated light elements is positionable within one of the light element gaps between adjacent ones of the third elongated light elements

540 — Maintaining contiguity of each of the second elongated light elements with a pair of the third elongated light elements and with a pair of the first elongated light elements while radially translating the first, second, and third elongated light elements to the third radial location

FIG. 14C

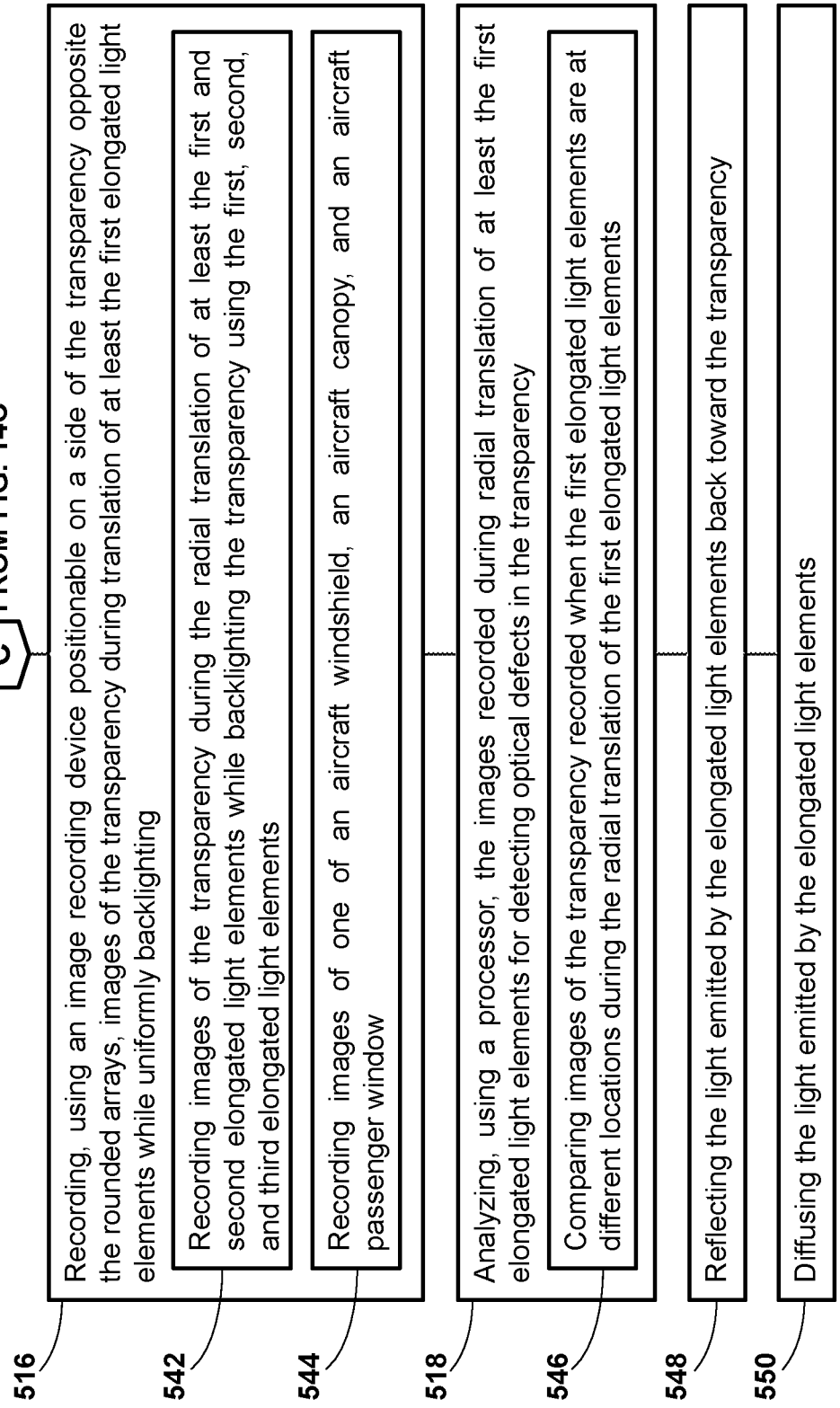

DYNAMIC BACKLIGHTING SYSTEM AND METHOD FOR INSPECTING A TRANSPARENCY

FIELD

The present disclosure relates generally to inspection systems and, more particularly, to a system and method for inspecting a transparency using dynamic backlighting.

BACKGROUND

Transparencies are used in a variety of different applications including vehicular applications such as in marine, land, air and/or space vehicles and in non-vehicular applications such as in buildings and other stationary structures. In vehicular applications such as in commercial aircraft, transparencies may be mounted along the aircraft cabin and around the aircraft flight deck and may include windshields and other forward, side and overhead windows. Transparencies may be formed of glass and polymeric materials or as laminated combinations of glass and polymeric materials. Polymeric materials for transparencies may include, without limitation, acrylic and polycarbonate compositions.

When fabricating a transparency of polycarbonate material, certain optical defects may occur during the forming process. For example, optical inclusion defects such as carbon particulates may occur during the formation of a polycarbonate transparency and may appear as relatively small black spots embedded within the transparency. When viewed through the transparency, an embedded carbon particulate may be misinterpreted as a long-distance object. In an automobile windshield or in a commercial aircraft flight-deck window, optical inclusion defects may be an annoyance to the automobile driver or the aircraft pilot. However, a particulate embedded in a fighter aircraft windshield may be mistaken by a pilot for an enemy aircraft and a potential source of combat. Other optical defects may occur in the transparency such as runs and sags which can also affect the quality of the transparency.

Included in the prior art are several methods for inspecting transparencies for optical defects. One example involves inspecting an aircraft canopy by manually looking upwardly though the aircraft canopy searching for defects using the sky as a background. This inspection technique requires generally clear (e.g., non-cloudy) atmospheric conditions in order to provide a homogenously lit background against which an inspector can view the entirety of the aircraft canopy. As may be expected, this inspection technique may result in significant aircraft downtime while waiting for the appropriate atmospheric conditions.

Other examples of prior art are methods for inspecting transparencies include camera-driven methods developed in the automotive industry for inspection of automotive transparencies such as automotive windshields. Unfortunately, such camera-driven methods may lack the resolution required for inspection of aerospace transparencies. For example, the methods used in the automotive industry are typically directed toward inspection of a transparency on a production line wherein the size of allowable defects is typically larger than the allowable defect size (e.g., 0.030 inch) of aerospace transparencies.

Furthermore, inspection methods used in the automotive industry are typically directed toward transparencies having relatively slight curvatures as compared to aircraft transparencies such as aircraft canopies and windshields which may have more complex curves and which may be of smaller radii. In addition, the cross-sectional layup of an aircraft transparency such as an aircraft windshield is generally more complex than an automotive transparency due to the higher strength requirements and increased thickness (e.g., up to 1 inch thick or larger) of an aircraft windshield which may be necessary for surviving bird strikes and handling structural loads.

As can be seen, there exists a need in the art for a system and method for detecting optical defects in a transparency that provides an automated means for recording images of the transparency in order to document the location of optical defects in a reduced amount of inspection time. Furthermore, there exists a need in the art for a system and method for detecting optical defects that are of relatively small size. Finally, there exists a need in the art for a system for detecting optical defects that is simple in construction, low in cost, and which may be implemented for inspecting a wide range of transparency configurations.

SUMMARY

The above-noted needs associated with detecting optical defects in a transparency are addressed by the presently-disclosed inspection system which includes a first rounded array of first elongated light elements, and a second rounded array of second elongated light elements configured to backlight the transparency. The second rounded array is positionable radially outboard of the first rounded array. The inspection system further includes a light-element-moving system configured to radially translate at least the first elongated light elements. The inspection system also includes an image recording device positionable on a side of the transparency opposite the first and second rounded arrays and configured to record images of the transparency during radial translation of at least the first elongated light elements during backlighting of the transparency. The inspection system includes a processor configured to analyze the images recorded during radial translation of at least the first elongated light elements, and detect optical defects in the transparency based on analysis of the images.

In another example, the inspection system comprises a plurality of rounded arrays of elongated light elements, including a first rounded array of first elongated light elements positionable at a first radial location having an array center defining an array axis. The first elongated light elements are oriented generally parallel to each other and to the array axis. The inspection system also includes a second rounded array of second elongated light elements concentric with the first rounded array and positionable radially outboard of the first elongated light elements at a radial location where the second elongated light elements are circumferentially spaced apart from each other to define a plurality of light element gaps respectively between adjacent pairs of the second elongated light elements. Each one of the light element gaps is radially aligned with one of the first elongated light elements. The second elongated light elements are oriented parallel to each other. The inspection system further includes a light-element-moving system configured to radially translate at least the first elongated light elements. Additionally, the inspection system includes a fixture configured to support at least one image recording device positionable on a side of the transparency opposite the rounded arrays and configured to record images of the transparency during radial translation of the elongated light elements while the elongated light elements backlight the transparency. Furthermore, the inspection system includes a processor configured to analyze the images recorded during radial translation of at least the first elongated light elements, and detect optical defects in the transparency based on analysis of the images.

Also disclosed is a method of detecting optical defects in a transparency. The method includes emitting light from a plurality of first elongated light elements oriented parallel to each other and arranged in a first rounded array and positionable at a first radial location. The method additionally includes emitting light from a plurality of second elongated light elements oriented parallel to each other and arranged in a second rounded array concentric with the first rounded array and positionable at a second radial location in which the second elongated light elements are circumferentially spaced apart from each other to define a plurality of light element gaps respectively between adjacent pairs of the second elongated light elements. The method also includes radially translating the first elongated light elements between the first radial location and the second radial location. Additionally, the method includes recording, using an image recording device positionable on a side of the transparency opposite the rounded arrays, images of the transparency during translation of at least the first elongated light elements while backlighting the transparency using the light emitted from the first and second elongated light elements. The method further includes analyzing, using a processor, the images recorded during radial translation of at least the first elongated light elements for detecting optical defects in the transparency.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 5 is an illustration of a magnified portion of the light-element-moving system identified by reference numeral 5 of FIG. 4 and illustrating an actuator comprising a drive motor for driving a threaded rod for radial translation of the elongated light element;

FIG. 6 is a section view taken of the light-element-moving system along line 6 of FIG. 5 and illustrating a lower portion of one of the elongated light elements supported on a track member and coupled to the threaded rod via the ballscrew nut;

FIGS. 14A, 14B, 14C, and 14D are collectively a block diagram of a method of detecting optical defects in a transparency.

DETAILED DESCRIPTION

Figure 1:
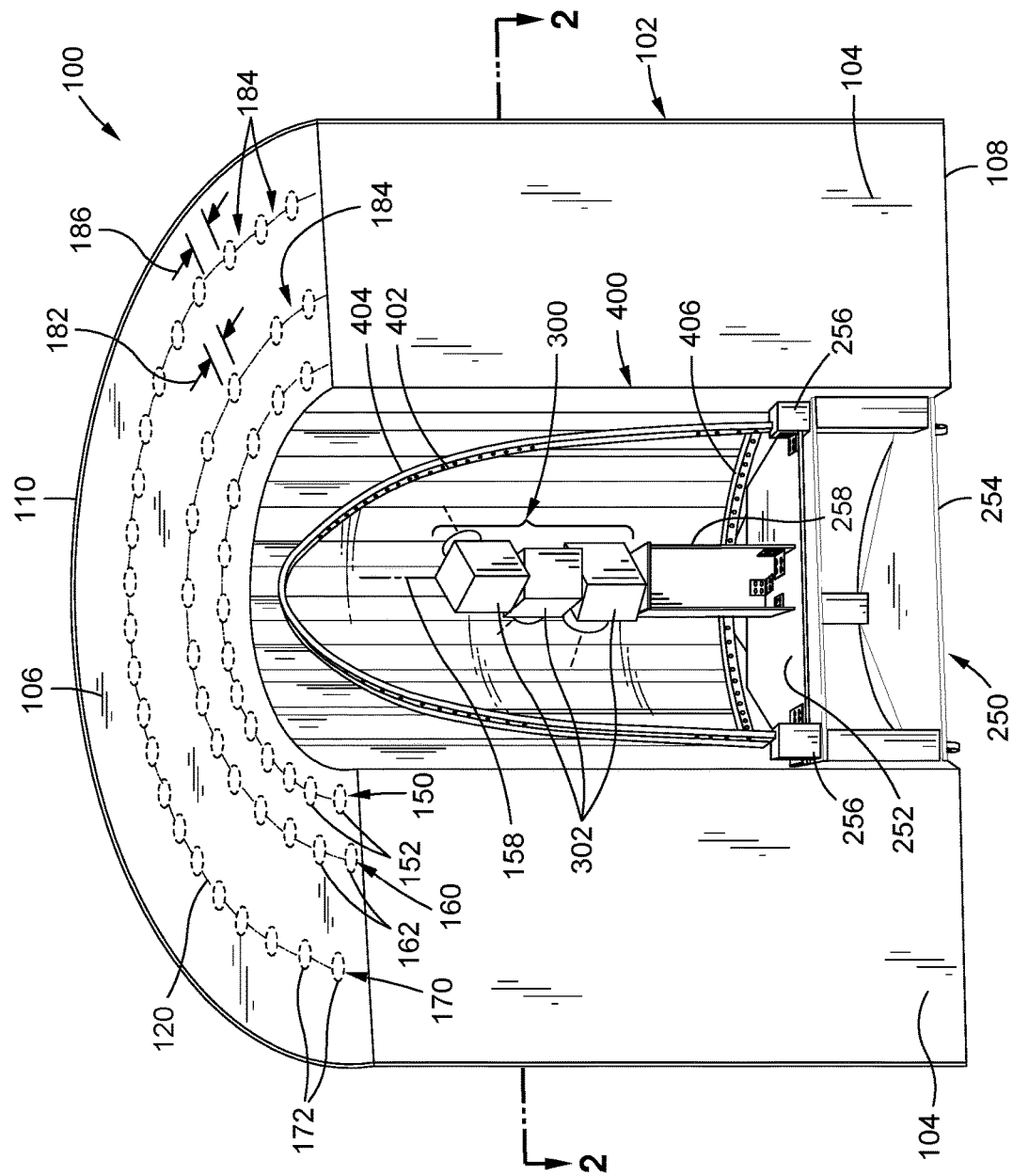
FIG. 1 is a perspective view of an example of an inspection system for detecting optical defects in a transparency.
Figure 2:
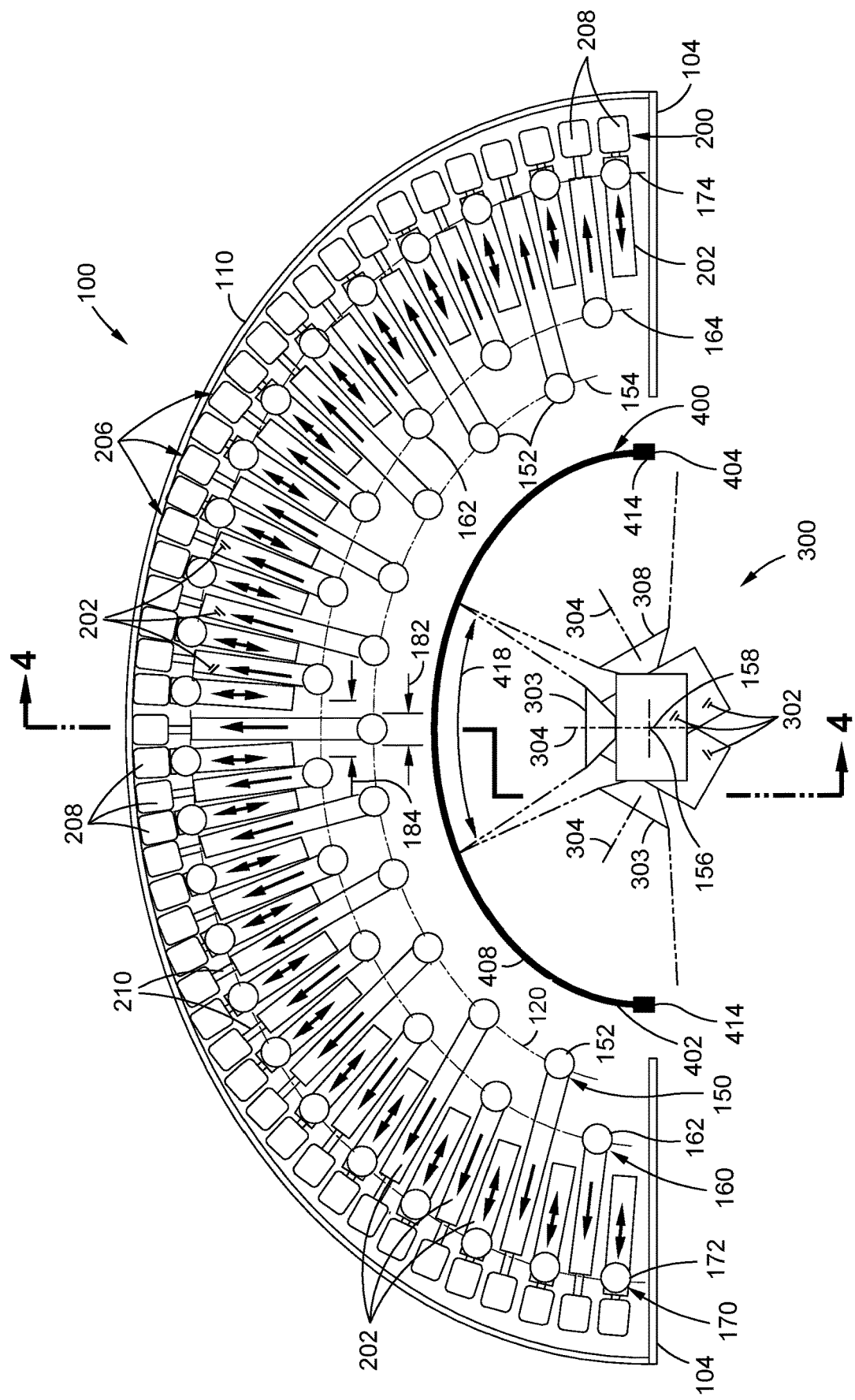
FIG. 2 is a sectional top view taken along line 2 of FIG. 1 and illustrating the inspection system having a first rounded array of first elongated light elements, a second rounded array of second elongated light elements, and a third rounded array of third elongated light elements, and further illustrating an image recording device comprising a plurality of areal cameras for recording images of the transparency during radial translation of the elongated light elements while the elongated light elements backlight the transparency.
Figure 3:
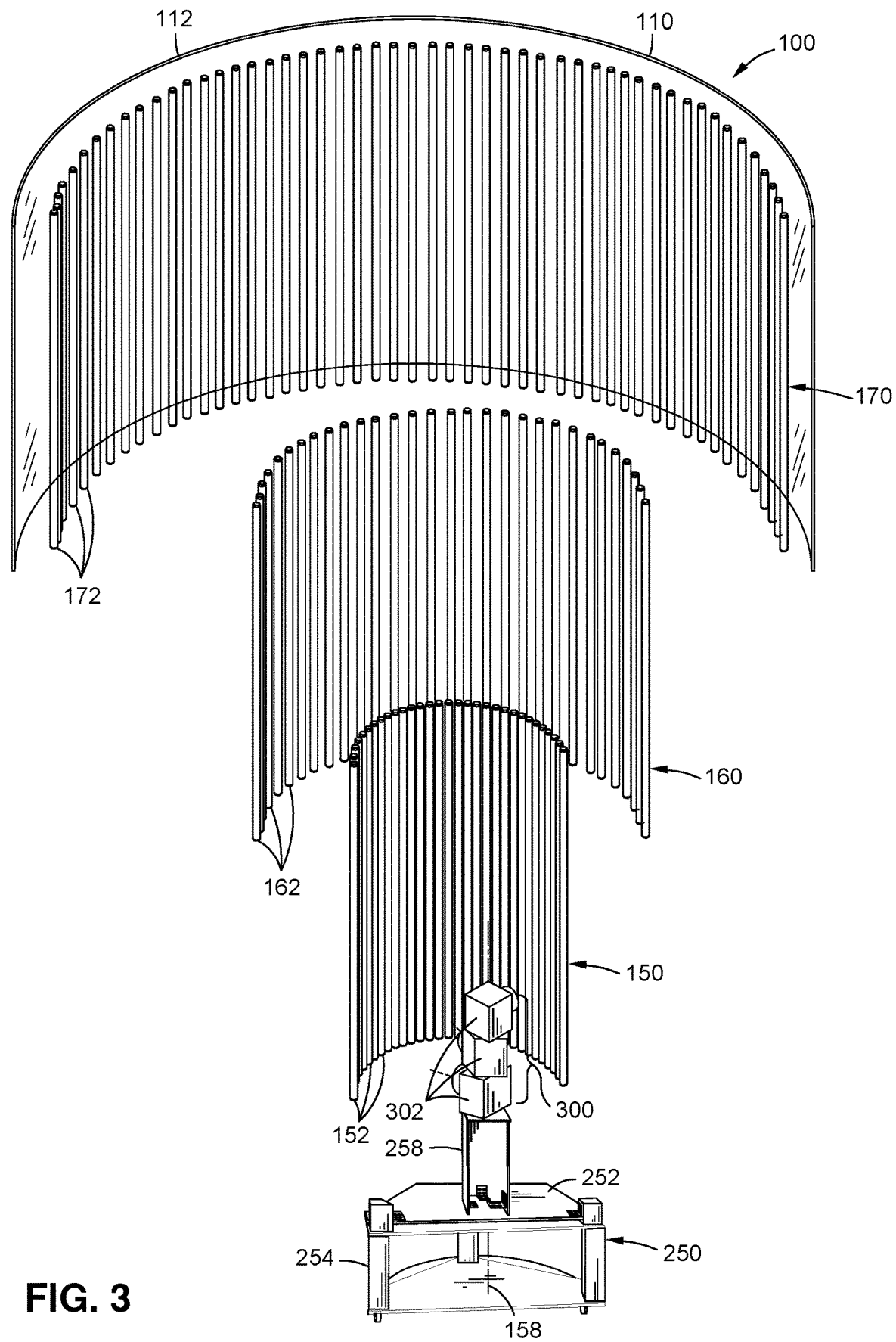
FIG. 3 is an exploded perspective view of an example of an inspection system for detecting optical defects in a transparency (not shown) supportable on a fixture, and further illustrating a first rounded array, a second rounded array, and a third rounded array of elongated light elements for backlighting the transparency during the recording of images by an image recording device configured as a vertical stack of areal cameras.

Referring now to the drawings which illustrate various examples of the disclosure, shown in FIG. 1 is a perspective view of an example of an inspection system 100 for detecting optical defects in a transparency 400. FIG. 2 is a sectional top view of the inspection system 100 and the transparency 400. FIG. 3 is a partially exploded view of the inspection system 100. The inspection system 100 includes a plurality of rounded arrays (e.g., first, second, and third rounded arrays 150, 160, 170) of elongated light elements (e.g., first, second, and third elongated light elements 152, 162, 172), a light-element-moving system 200 (e.g., FIGS. 4-6), at least one image recording device 300 (e.g., FIGS. 1-4 and 7), and a processor 220 (e.g., FIG. 4).

The rounded arrays of elongated light elements are configured to homogenously and/or uniformly backlight the transparency 400 while the light-element-moving system 200 translates the elongated light elements of at least one rounded array along a radial direction. During the radial translation of the elongated light elements, the image recording device 300 records images of the transparency 400. The processor 220 is configured to analyze the images recorded during radial translation of the elongated light elements and detect optical defects in the transparency 400 based on analysis of the images, as described in greater detail below. The radial translation of the elongated light elements during imaging of the transparency 400 causes optical defects in the transparency 400 to be emboldened and therefore easier to detect than a system (not shown) having static light elements. In this regard, the presently-disclosed inspection system 100 allows for detection of optical defects that may be otherwise undetectable using still photography.

Referring to FIGS. 1-4, the transparency 400 is shown as an aircraft windshield 402. The aircraft windshield 402 may be a fighter aircraft windshield having a relatively small radius of curvature as compared to a generally large radius of curvature or flatter flight-deck window or windshield of a commercial transport aircraft. In the example shown, the aircraft windshield 402 has a transparency frame 404 including an arch member 406 on an aft end of the aircraft windshield 402. The aircraft windshield 402 includes a viewing portion 408 (FIG. 4) through which a pilot may view objects that are external to the aircraft windshield 402. The viewing portion 408 comprises the optically transparent portion of the aircraft windshield 402 that is unblocked by the transparency frame 404 or the arch member 406. Although described in the context of an aircraft windshield 402, the inspection system 100 may be implemented for inspecting other types of aircraft transparencies including aircraft canopies (not shown), aircraft passenger windows (not shown), and other types of curved or non-curved transparencies for use in any one of a variety of vehicular applications including marine, land, air and/or space vehicles. The inspection system 100 may also be implemented for inspecting transparencies for non-vehicular applications including transparencies that are generally planar or flat (not shown) such as window panels or glazing materials used in building construction. The inspection system 100 may also be implemented for inspecting transparencies for use in any one of a variety of assemblies or systems including, but not limited to, instrumentation systems, lighting assemblies, and other types of transparencies.

In FIGS. 1-4, the plurality of rounded arrays of elongated light elements include a first rounded array 150 of first elongated light elements 152, and a second rounded array 160 of second elongated light elements 162, and may optionally include additional rounded arrays such as a third rounded array 170 of third elongated light elements 172 as described below, and optionally one or more additional rounded arrays (not shown). As shown in FIG. 2, the first rounded array 150 of first elongated light elements 152 are positionable at a first radial location 154 having an array center 156 (FIG. 2) defining an array axis 158 (FIG. 2). The first elongated light elements 152 are oriented generally parallel to each other and to the array axis 158 as shown in FIG. 3. In some examples, the first elongated light elements 152 of the first rounded array 150 may initially be contiguous with each other (e.g., see FIG. 8A). In this regard, each of the first elongated light elements 152 may initially (e.g., prior to radial translation) be in contact with at least one of the other first elongated light elements 152. However, in other examples, the first elongated light elements 152 may initially be non-contiguous with each other prior to radial translation of the first elongated light elements 152. The first elongated light elements 152 may all be of the same configuration and same size. For example, the first elongated light elements 152 may all have the same light element width 182 (FIG. 1). However, in another example not shown, the first elongated light elements 152 may be of different configurations and/or sizes.

The second rounded array 160 of second elongated light elements 162 are concentric with the first rounded array 150 and are positionable radially outboard of the first elongated light elements 152 at a radial location where the second elongated light elements 162 are circumferentially spaced apart from each other to define a plurality of light element gaps 184 (FIG. 1) respectively between adjacent pairs of the second elongated light elements 162. Each one of the light element gaps 184 is radially aligned with one of the first elongated light elements 152. The second elongated light elements 162 are oriented parallel to each other. The second elongated light elements 162 may be circumferentially spaced apart from each other at a uniform spacing. In some examples, the light element gap 184 between each adjacent pair of second elongated light elements 162 may be sized to receive one of the first elongated light elements 152. For example, the gap width 186 (FIG. 1) of the light element gap 184 between adjacent pairs of the second elongated light elements 162 may be approximately equal to or slightly larger (e.g., less than 0.100 inch larger) than the light element width 182 of each one of the first elongated light elements 152. The second elongated light elements 162 may all be of the same configuration and same size, and which may be the same configuration and same size as the first elongated light elements 152. However, as mentioned above with regard to the first elongated light elements 152, the second elongated light elements 162 may be of different configurations and/or different sizes, and/or the second elongated light elements 162 may be of different configurations and/or different sizes than the first elongated light elements 152.

Figure 8A:
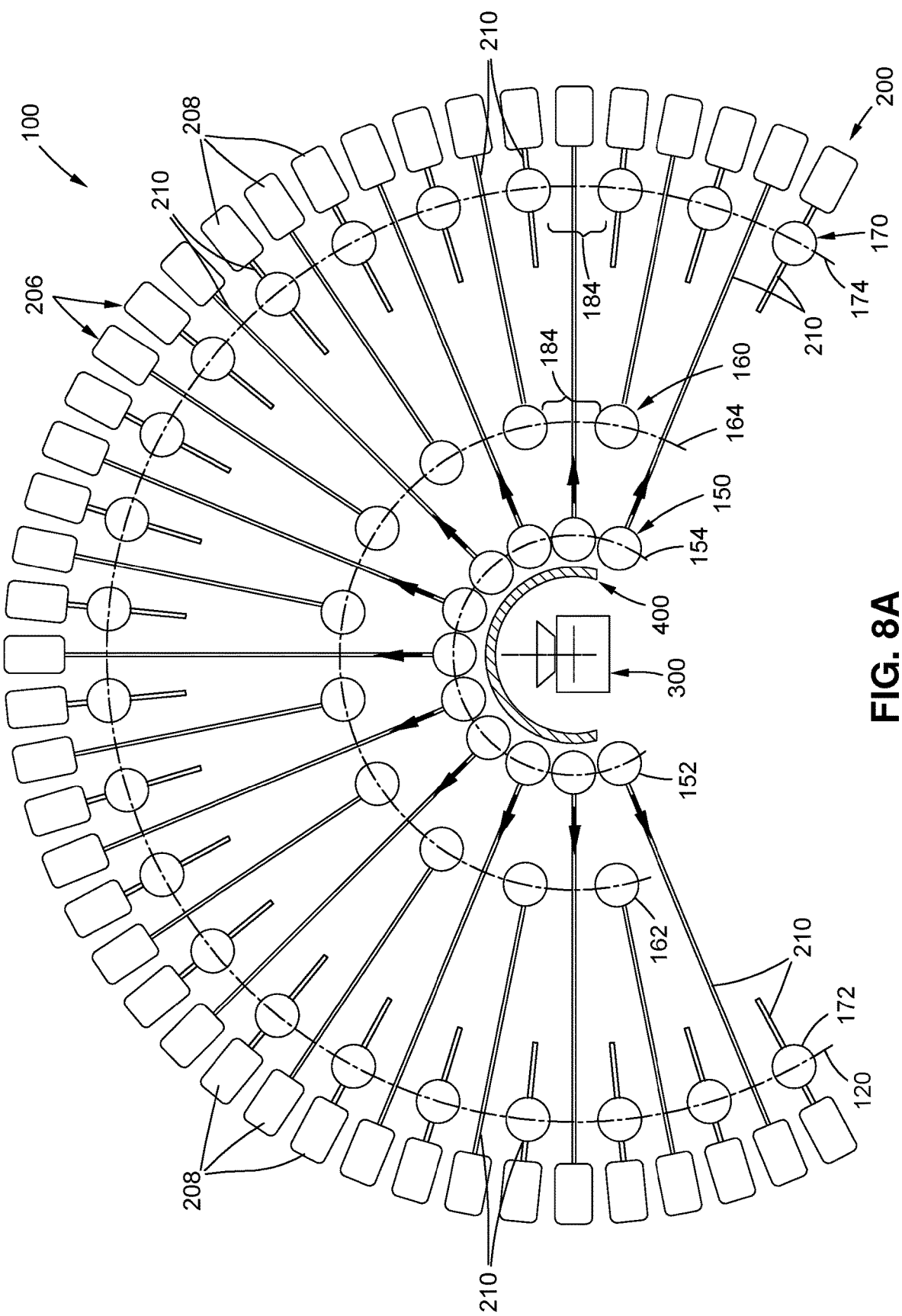
FIGS. 8A, 8B and 8C are schematic views of an inspection system having arc-shaped arrays of elongated light elements and illustrating an example of a sequence of radially translating a plurality of first elongated light elements from a first radial location to a second radial location until each of the first elongated light elements is positioned between a pair of second elongated light elements, followed by the radial translation of the first and second elongated light elements from the second radial location to a third radial location of a plurality of third elongated light elements.
Figure 8B:
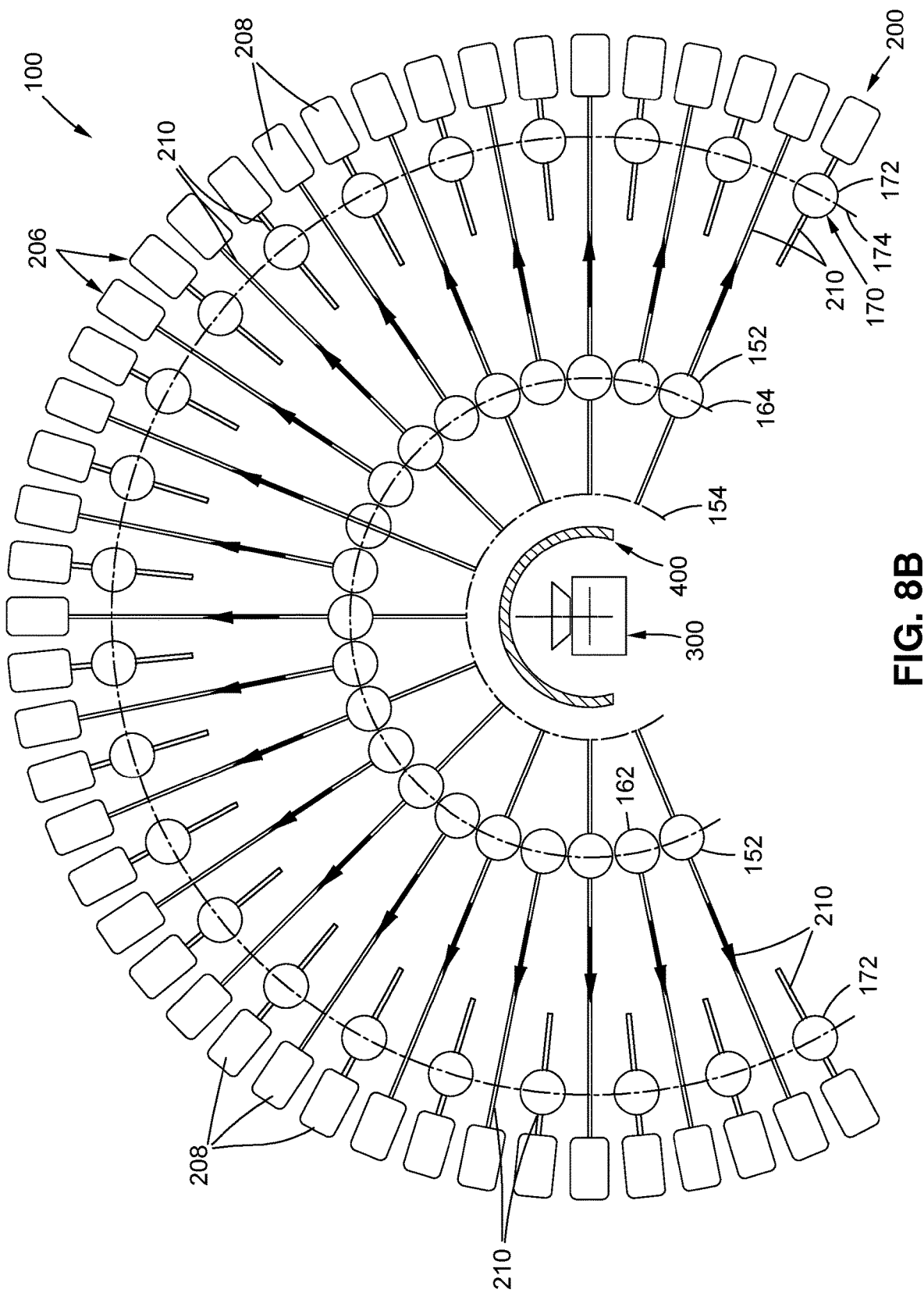

As described in greater detail below, the light-element-moving system 200 (e.g., FIGS. 4-6) is configured to translate the elongated light elements along a radial direction. For example, the light-element-moving system 200 may translate the first elongated light elements 152 from the first radial location 154 to the second radial location 164 as shown in FIGS. 8A and 8B and described in greater detail below. In the present disclosure, the elongated light elements may be initially arranged (e.g., FIGS. 8A-13F) to allow the light-element-moving system 200 to radially translate the elongated light elements along a radially outward direction while the image recording device 300 records images of the transparency 400. However, in other examples not shown, the elongated light elements may be initially arranged to allow the light-element-moving system 200 to radially translate the elongated light elements along a radially inward direction while the image recording device 300 records images of the transparency 400. For example, although not shown in the figures, the first elongated light elements 152 may initially be located at the second radial location 164 in alternating relationship with the second elongated light elements 162 also at the second radial location 164, and the light-element-moving system 200 may translate the first elongated light elements 152 from the second radial location 164 to the first radial location 154 while the image recording device 300 records images of the transparency 400. In still other examples, the inspection system 100 may be operated in a manner to record images of the transparency 400 during radially outward translation of the elongated light elements, followed by recording images of the transparency 400 during radially inward translation of the elongated light elements to potentially enable the detection of optical defects that may only be detectable during either radially outward translation of the elongated light elements or during radially inward translation of the elongated light elements.

As mentioned above, the inspection system 100 includes at least one image recording device 300 positionable on a side of the transparency 400 opposite the rounded arrays of elongated light elements. The image recording device 300 may be positionable proximate the array center 156 (FIG. 2) of the rounded arrays. The image recording device 300 is configured to record images of the transparency 400 during radial translation of the elongated light elements while the elongated light elements backlight the transparency 400.

In the example of FIGS. 1-4, the image recording device 300 may be configured as one or more cameras, such as one or more areal cameras 302. An areal camera is one that captures an image of an area such as an expanse of space, a surface, or a region of land. The image recording device 300 may be configured to operate in the visible-light spectrum. In the example shown, the inspection system 100 includes three (3) areal cameras 302 arranged in a vertical stack. In the present disclosure, an areal camera 302 may be described as a statically-positioned camera configured to record images of an area of the transparency 400. An areal camera 302 may be a digital camera or an analog (e.g., film) camera. In addition, an areal camera 302 may be configured to record images of the transparency 400 at any number of frames per second during radial translation of the elongated light elements. In still other examples, an areal camera 302 may be a statically-positioned video camera configured to record video of the transparency 400 during radial translation of the elongated light elements. A video recording of the transparency 400 may effectively define a continuous stream of images of the transparency 400.

In the example of FIGS. 1-4, each one of the areal cameras 302 may have a vertical field of view 416 (FIG. 4) encompassing an upper edge 410 and a lower edge 412 of the transparency 400. In addition, each one of the areal cameras 302 may have a horizontal field of view 418 (FIG. 2) encompassing a portion of the total width of the transparency 400 including the lateral edges 414 of the transparency 400. Each one of the areal cameras 302 may include a lens 303 (FIG. 2) having an optical axis 304 (FIG. 2). The areal cameras 302 may be arranged in the vertical stack such that the optical axis 304 of each lens 303 is oriented at a different circumferential angle. In this regard, each one of the areal cameras 302 may have a horizontal field of view 418 capable of recording at least one-third of the width of the viewing portion 408 of the transparency 400. For example, in the vertical stack of areal cameras 302 shown in FIGS. 1-2, the bottommost areal camera 302 may be oriented for recording one of the lateral edges 414 of the transparency and at least the left-hand third of the width of the viewing portion 408 (FIG. 2) of the transparency 400, the middle areal camera 302 may be oriented for recording at least the middle third of the width of the viewing portion 408 of the transparency 400, and the uppermost areal camera 302 may be oriented for recording one of the lateral edges 414 of the transparency and at least the right-hand third of the width of the viewing portion 408 of the transparency 400. The horizontal field of view 418 of the cameras may overlap with each other to avoid any gaps in the inspection of the transparency 400.

Figure 4:
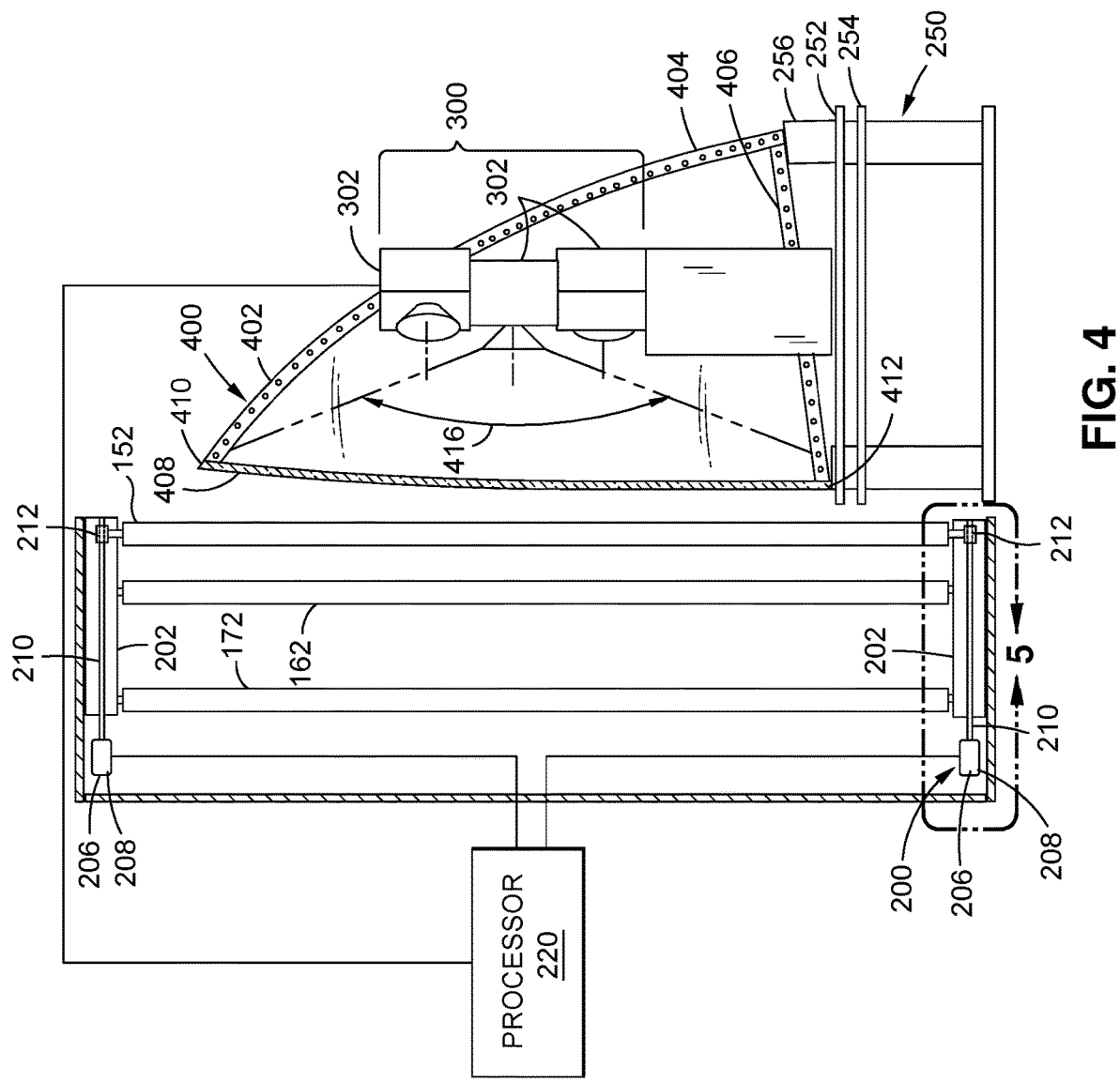
FIG. 4 is a sectional side view of the system taken along line 4 of FIG. 2 and illustrating an example of a light-element-moving system configured to translate the elongated light elements along a radial direction while backlighting the transparency during the recording of images by the image recording device.
Figure 7:
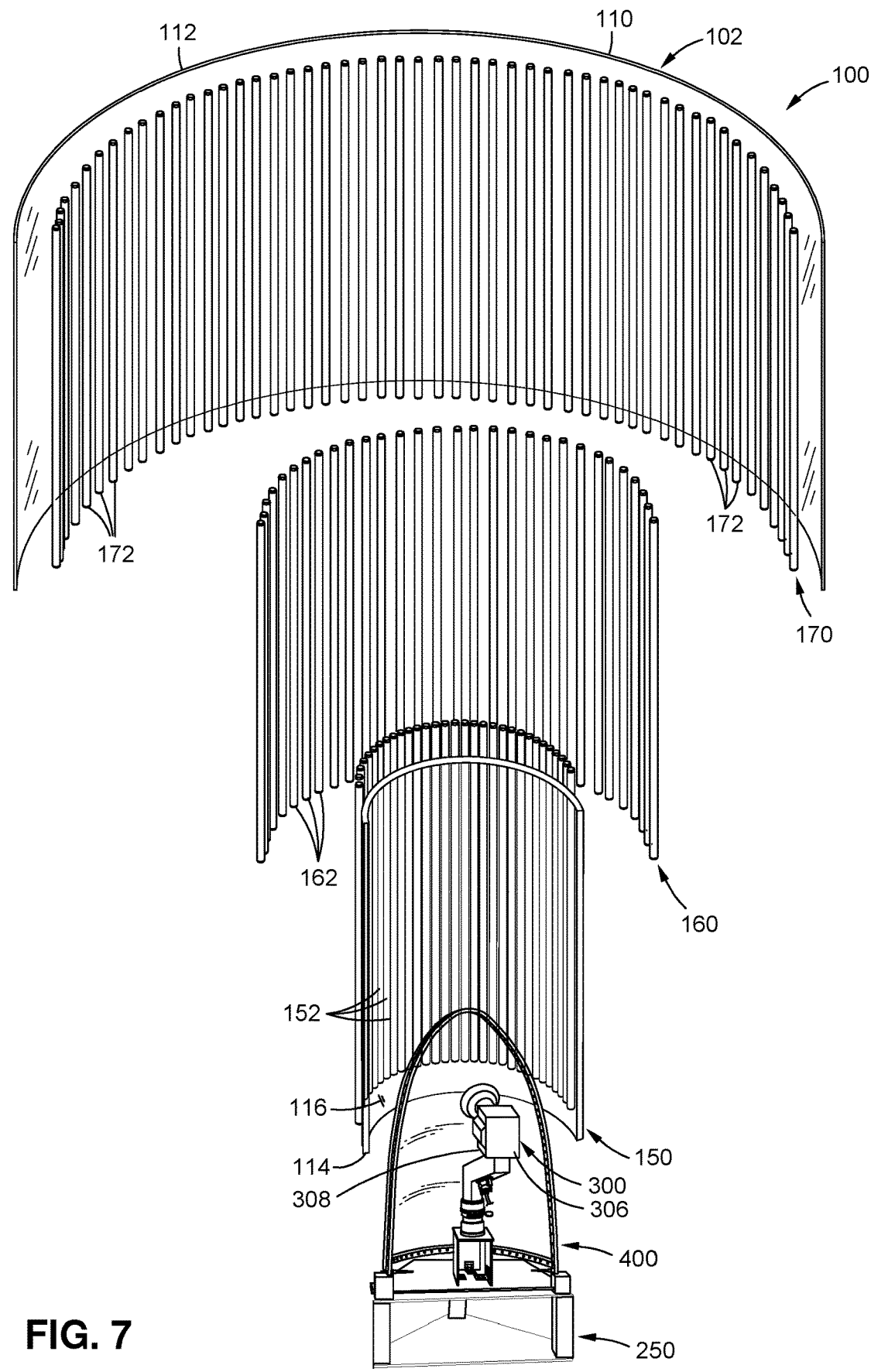
FIG. 7 is an exploded perspective view of an example of an inspection system in which the image recording device is configured as a panoramic camera.

Collectively, the areal cameras 302 may record images of the entirety of the viewing portion 408 (FIG. 4) of the transparency 400 for analysis by the processor 220 (FIG. 4) for detecting optical defects in the transparency 400 in a manner described below. Although the imaging recording device is shown as three (3) vertically-stacked areal cameras 302, any number of areal cameras 302 may be provided, including a single areal camera 302, two (2) areal cameras 302, or four (4) or more areal cameras 302. In the present disclosure, any arrangement of statically-positioned cameras, including a single areal camera 302, may be configured to record an entirety of the viewing portion 408 of the transparency 400. A single areal camera (not shown) may be laterally positioned by the fixture 250 proximate the array axis 158 as described above and shown in FIG. 2, and may be vertically positioned by the fixture 250 (FIG. 1) at an approximate mid-length location of the transparency 400 as shown in FIG. 4. As an alternative to statically-positioned areal cameras 302, the image recording device 300 may be configured as a line scanning panoramic camera 306 rotatable about an axis of rotation 308 for recording a horizontal field of view 418 of the transparency 400, as shown in FIG. 7 and described in greater detail below. Regardless of configuration, the image recording device 300 may be configured to capture images of the transparency 400 which the processor 220 may analyze for detection of optical defects. The image recording device 300 may have a resolution capability for recording images that enable detection (e.g., via processor analysis) of optical defects having a cross-sectional width at least as small as about 0.001 inches.

Referring to FIG. 4, as mentioned above, the processor 220 is configured to analyze the images recorded during radial translation of the elongated light elements and detect optical defects in the transparency 400 based on analysis of the images. In addition, the processor 220 may be communicatively coupled to the image recording device 300 and may control the operation of the image recording device 300. For example, the processor 220 may prompt the image recording device 300 (e.g., the areal cameras 302) to record images of the transparency 400 immediately prior to or at the start of radial translation of the elongated light elements, and may command the image recording device 300 to stop recording images at the completion of radial translation of the elongated light elements.

As shown in FIG. 4, the processor 220 may also be communicatively coupled to the light-element-moving system 200. As described in greater detail below, the processor 220 may prompt the light-element-moving system 200 to radially translate the elongated light elements during the recording of images by the image recording device 300. Analysis of the images by the processor 220 may be performed in real-time during the recording of images as the elongated light elements are radially translated. Alternatively or additionally, analysis of the images by the processor 220 may be performed after completion of the radial translation of the elongated light elements.

The processor 220 may analyze the images to detect the presence of optical defects in the transparency 400. Analysis of the images by the processor 220 may include determining the location of such optical defects in the transparency 400. Examples of optical defects that may be detected by the inspection system 100 include, but are not limited to, particulates (not shown), runs (not shown), and/or sags (not shown) in a transparency 400. Particulates may be comprised of carbon, dust, or other inclusions and may appear as relatively small black spots embedded within the transparency 400. Runs or sags may comprise localized in-plane sagging of the material of the transparency 400. Light rays may be scattered by particulates, runs, and/or sags and may result in areas of optical distortion appearing in the images recorded by the image recording device 300.

The processor 220 may determine the locations of optical defects in the transparency 400 by comparing each image to a baseline image (not shown). In one example, a baseline image may be an image of a transparency sample (not shown) known to be free of optical defects. Defect-free images of a transparency sample may be recorded using the same type of image recording device 300 that is to be used to inspect the transparency 400. In addition, defect-free images of a transparency sample may be recorded using the same arrangement of elongated light elements radially translated in the same manner as during the imaging of the transparency 400 to be inspected. As an alternative to using defect-free images of a transparency sample as baseline images, defect-free images may also be images of only the elongated light elements against which the transparency 400 is to be inspected. Baseline images may also be images of the transparency 400 against the arrangement of rounded arrays just prior to the start of radial translation. Regardless of how the baseline images are generated, one or more baseline images may be stored in a database of the processor 220 to be used by the processor 220 for comparison to images of the transparency 400 recorded by the image recording device 300.

The images of the transparency 400 recorded during radial translation of the elongated light elements may be compared on a pixel-by-pixel basis to one or more baseline images in order to detect optical defects. The comparison may be performed in real-time during the recording of images, or the comparison may be performed after the recording of the images is complete. As indicated above, the processor 220 may determine and record the size of each optical defect detected in the transparency 400. In addition, the processor 220 may identify the type of optical defect (e.g., particulates, runs, or sags) and may define the location of each optical defect relative to a predetermined physical reference point (not shown) on the transparency 400. For example, the processor 220 may identify the location of each optical defect in terms of x,y,z coordinates relative to a predetermined physical reference point on the transparency 400 such as a predetermined structural feature and/or geometric feature on the transparency 400.

In an example (not shown) of an inspection system 100 having rounded arrays limited to a first rounded array 150 of first elongated light elements 152 and a second rounded array 160 of second elongated light elements 162, the image recording device 300 may record images during radial translation of the first elongated light elements 152 from a first radial location 154 (e.g., FIG. 8A) to the second radial location 164 (e.g., FIG. 8B). Prior to radial translation from the first radial location 154 of the second radial location 164, the image recording device 300 may optionally record one or more images of the transparency 400 when the first elongated light elements 152 are at the first radial location 154. Alternatively or additionally, in some examples, the image recording device 300 may record one or more images of the transparency 400 when the first elongated light elements 152 are located within the light element gaps 184 between adjacent pairs of the second elongated light elements 162 at the second rounded array 160.

Figure 8C:
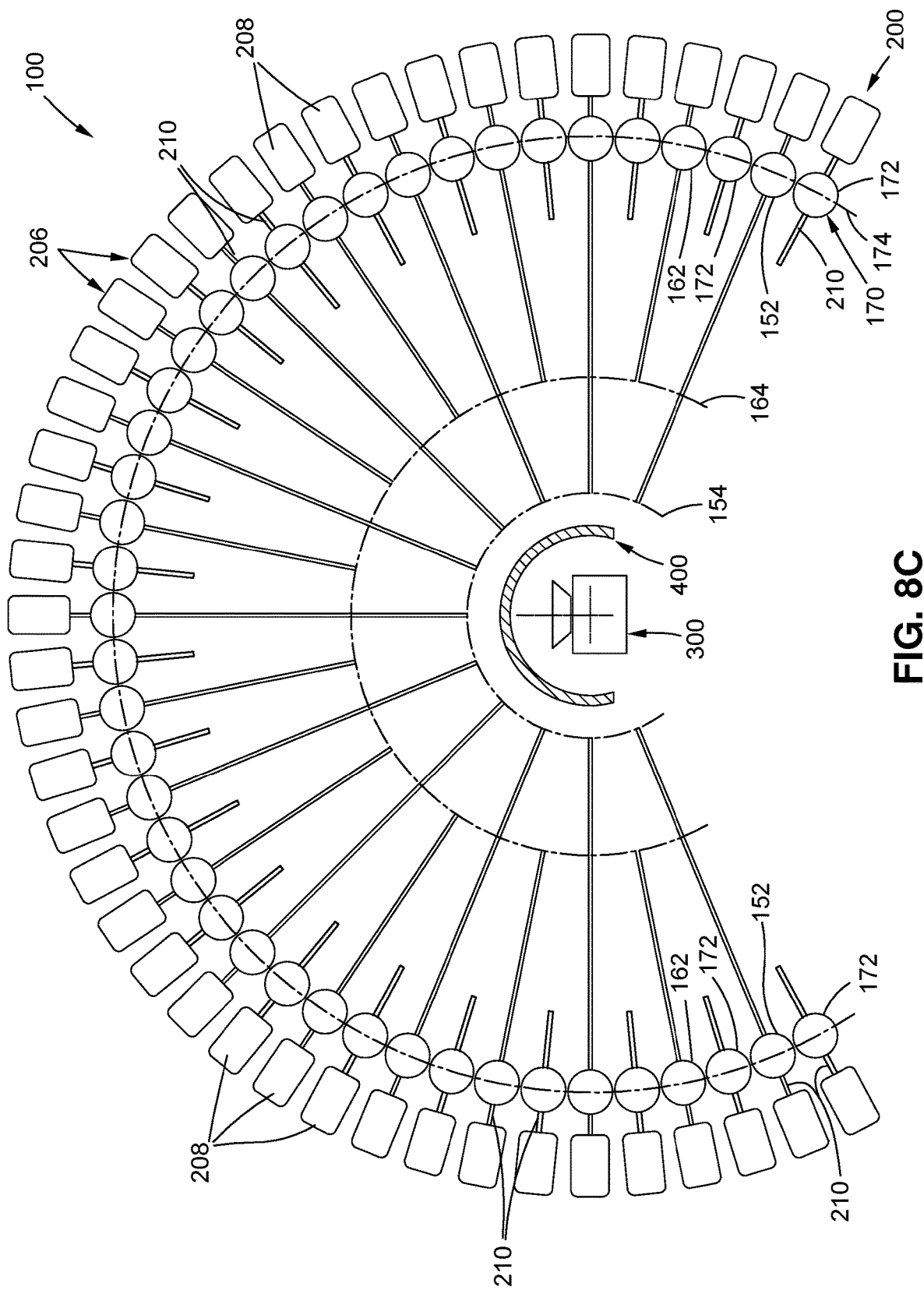

As mentioned above and shown in FIGS. 1-4, in addition to the first rounded array 150 and second rounded array 160, an inspection system 100 may include a third rounded array 170 of third elongated light elements 172 positionable radially outboard of and concentric with the first rounded array 150 and second rounded array 160. The third elongated light elements 172 may be oriented parallel to each other and to the array axis 158. The third elongated light elements 172 may be circumferentially spaced apart from each other. In this regard, the third rounded array 170 may define a plurality of light element gaps 184 (FIG. 1) respectively between adjacent pairs of the third elongated light elements 172. The light element gap 184 between each pair of third elongated light elements 172 may be sized to receive either one of the first elongated light elements 152 or one of the second elongated light elements 162. For example, the light element gap 184 between each of the third elongated light elements 172 may have a gap width 186 (FIG. 1) that is substantially equivalent to or slightly larger (e.g., less than 0.100 inch larger) than the light element width 182 (FIG. 1) of each of the first elongated light elements 152 and each of the second elongated light elements 162. At the completion of radial translation of the elongated light elements, the third radial location 174 may include an alternating arrangement of first elongated light elements 152, second elongated light elements 162, and third elongated light elements 172, as shown in FIG. 8C and described in greater detail below. However, as mentioned above, the inspection system 100 may include additional rounded arrays (not shown) such as a fourth rounded array, a fifth rounded array, or any number of rounded arrays of elongated light elements.

In any one of the examples of the inspection system 100 disclosed herein, the elongated light elements may be configured as fluorescent light bulbs (e.g., fluorescent tubes). In other examples, the elongated light elements may be provided as incandescent light bulbs, halogen light bulbs, or as light-emitting diodes. For example, each one of the elongated light elements may be comprised of a linear array of incandescent light bulbs or as a linear array of halogen light bulbs. Light-emitting diodes may be provided in a linear array which may optionally be encased in a cylindrical tube (e.g., a tubular diffuser). Each one of the elongated light elements may be straight or linear. For example, fluorescent light bulbs may be generally straight. However, in other examples not shown, each one of the elongated light elements may have a curvature in the vertical direction that is complementary to a curvature in the vertical cross-section (not shown) of the transparency 400. Each of the elongated light elements may have a length that is at least as long as the transparency 400.

As shown in FIGS. 1-4, the elongated light elements in each one of the rounded arrays may be arranged complementary to the contour of the transparency 400. For example, the first, second, and third elongated light elements 152, 162, 172 respectively in the first, second, and third rounded arrays 150, 160, 170 may be fluorescent light bulbs oriented parallel to each other and arranged in an arcuate shape that is complementary to the cross-sectional shape of the transparency 400 and positionable, via the fixture 250, at a uniformly spaced distance from the transparency surface to produce uniformly distributed backlighting of the transparency 400. In some examples of the inspection system 100, each one of the rounded arrays may be an arc-shaped array 120 (FIGS. 1-2). For example, in FIGS. 1-3, the first, second, and third rounded arrays 150, 160, 170 are each configured as a semi-elliptical array. In other examples of the inspection system 100, each one of the rounded arrays is a semi-circular array. For example, in FIGS. 8A-8C, the first, second, and third rounded arrays 150, 160, 170 are each configured as a semi-circular array. In still other examples of the inspection system 100, each one of the rounded arrays is a ring-shaped array 122 (FIG. 9A) such as a circular array or an elliptical array. For example, in FIGS. 9A-13F, the first, second, and third rounded arrays 150, 160, 170 are each configured as a circular array.

As mentioned above, the cross-sectional shape of the transparency 400 may dictate the shape of the rounded arrays. For example, a transparency 400 having a semi-circular cross-sectional shape may dictate a semi-circular shape of the rounded arrays. A circular cross-sectional shape of the transparency 400 may dictate a circular shape of the rounded arrays. A transparency 400 having an elliptical cross-sectional shape may dictate an elliptical shape of the rounded arrays. A transparency 400 having a semi-elliptical cross-sectional shape may dictate a semi-elliptical shape of the rounded arrays. However, an inspection system 100 may have rounded arrays of elongated light elements arranged in shapes that are different than the cross-sectional shape of the transparency 400. For example, circular arrays of elongated light elements may be used for inspecting a transparency 400 having an elliptical cross-sectional shape. Alternatively, an inspection system 100 having elliptical arrays of elongated light elements may be used for inspecting a transparency 400 having a circular cross-sectional shape.

In any one of the inspection system 100 examples disclosed herein, the rounded arrays of elongated light elements may be arranged in an angular span that results in each portion of the transparency 400 being backed by elongated light elements during the recording of images by the imaging recording device. In this regard, the angular span of the rounded arrays may be complementary to the angular span of the transparency 400 being inspected. For example, the cross-sectional view of FIG. 2 shows an aircraft windshield 402 having an angular span of approximately 180 degrees. Accordingly, the first, second, and third rounded arrays 150, 160, 170 may each have an angular span of approximately 180 degrees to ensure that each portion of the aircraft windshield 402 is backed entirely by elongated light elements during the recording of images. As may be appreciated, a transparency 400 may have any one of a variety of angular spans. For example, for certain aircraft, the aircraft windshield 402 may have an angular span of approximately 225 degrees which may dictate that the first, second, and third rounded arrays 150, 160, 170 each have an angular span of approximately 225 degrees.

Referring to FIGS. 1-2, the inspection system 100 may include a housing 102 for supporting the rounded arrays of elongated light elements in a structurally stable manner. In addition, the housing 102 may also support the below-described light-element-moving system 200. In the example of FIGS. 1-2, the housing 102 may include a top wall 106, a bottom wall 108, a pair of end walls 104, and an outer wall 110. The top wall 106 and the bottom wall 108 may be interconnected by the end walls 104 and the outer wall 110. In the example shown, the radially inner side of the housing 102 may be open to allow for unobstructed backlighting of the transparency 400 by the elongated light elements. In some examples, the outer wall 110 may be configured as a reflector 112 (FIG. 3) for reflecting light emitted by the elongated light elements in order to increase the intensity of the backlighting. In addition, the reflector 112 may eliminate the occurrence of shadows and/or bright spots in the backlighting of the transparency 400. The reflector 112 may be configured as a sheet of metallic material or plastic material having a reflective surface. The reflector 112 may also be comprised of a layer of paint, tape, or other material including reflective coatings applied to the inner surface of the outer wall 110.

Although not shown, the housing 102 may include electrical wiring for providing power to the elongated light elements and the light-element-moving system 200 from a power source (not shown). Although shown as a box-type structure having the above-described walls enclosing the elongated light elements, the inspection system 100 may alternatively include a frame (not shown) for supporting the rounded arrays of elongated light elements and the light-element-moving system 200. The frame may be openly accessible from one or more sides to enable access to the interior such as for replacing the elongated light elements when burned out and/or for substituting elongated light elements having different configurations or different light output characteristics (e.g., wavelength and/or brightness). Although not shown, the housing 102 may include wheels or rollers to facilitate transportability of the inspection system 100 such as within a production facility or an inspection facility.

Referring to FIGS. 1-4, the inspection system 100 may include a fixture 250 configured to support the image recording device 300. The fixture 250 may also support the transparency 400 in fixed relation to the image recording device 300. In addition, the fixture 250 may provide a means for positioning the transparency 400 relative to the rounded arrays of elongated light elements. In some examples, the fixture 250 may be fixedly coupled to the housing 102 and may be configured such that the transparency 400 may be positioned at a predetermined radial spacing away from the first rounded array 150. As mentioned above, the fixture 250 may be configured to position the transparency 400 such that any point of the viewing portion 408 has the elongated light elements in the background when the transparency 400 is viewed through the imaging recording device. In some examples, the fixture 250 may be independently movable relative to the housing 102. In this regard, the fixture 250 may optionally be mounted on wheels, casters, rollers or other devices to facilitate transportability of the fixture 250 and to allow for adjustment of the positioning and radial spacing of the transparency 400 from the first rounded array 150.

In the example of FIGS. 1-4, the fixture 250 may include a base 254 having a vertical height that positions the transparency 400 such that any point on the viewing portion 408 is backed by the elongated light elements when the transparency 400 is imaged by the image recording device 300. The base 254 may include a mounting plate 252. The aft end of the transparency 400 (e.g., the arch member 406) may be supported on the mounting plate 252. The fixture 250 may include one or more shim blocks 256 or other suitable height-adjustable mechanisms to facilitate a generally vertical orientation of the transparency 400. The transparency 400 may be fixedly secured in position to the fixture 250 in a manner preventing movement of the transparency 400 during inspection. For example, temporary fasteners or mounting pins (not shown) may be used to secure the transparency 400 to one or more of the shim blocks 256.

The fixture 250 may include a vertical frame 258 for supporting the imaging recording device 300. The vertical frame 258 may have a vertical height that positions the image recording device 300 such that the vertical field of view 416 (FIG. 4) of the image recording device 300 (FIG. 4) encompasses the upper edge 410 and the lower edge 412 of the transparency 400. In the example of FIGS. 1 and 3-4, the vertical frame 258 positions the stack of three (3) areal cameras 302 at an approximate mid-height of the transparency 400. More specifically, the vertical frame 258 may be configured such that the vertical field of view 416 of each of the areal cameras 302 encompasses the upper edge 410 (FIG. 4) and the lower edge 412 (FIG. 4) of the transparency 400.

Referring to FIGS. 4-6, shown is an example of a light-element-moving system 200 for radially translating the elongated light elements while backlighting the transparency 400. FIG. 4 is a sectional view of the inspection system 100 showing an example of a light-element-moving system 200 which may be configured as an array of radially oriented track members 202 and actuators 206 (e.g., FIGS. 8A-8C). The track members 202 and actuators 206 may be located on each of the upper and lower ends of each of the elongated light elements. In this regard, the upper end of each elongated light element may be supported and guided by a track member 202, and the lower end of each elongated light element may be supported and guided by a track member 202. Each track member 202 may define the path of radial translation of the elongated light element that it supports. For example, the track member 202 on the upper end and the lower end of each one of the first elongated light elements 152 may extend from the first radial location 154 to the third radial location 174 in accordance with the path of radial translation of the first elongated light elements shown in FIGS. 8A-8C. The track member 202 on the upper end and the lower end of each of the second elongated light elements 162 may extend from the second radial location 164 to the third radial location 174 also in accordance with the path of radial translation of the second elongated light elements shown in FIGS. 8A-8C. Although the third elongated light elements 172 are stationary in the movement scheme illustrated in FIGS. 8A-8C, the third elongated light elements 172 may each be mounted to a track member 202 on the upper end and on the lower end of the third elongated light elements 172 to enable radial translation of the third elongated light elements 172 in any one of a variety of alternative movement schemes, such as the movement schemes shown in the below-described examples of FIGS. 10A-13F. The track members 202 of each of the third elongated light elements 172 may extend radially inwardly from the third radial location 174 to a radial location that corresponds to the predetermined movement scheme of the first, second, and third elongated light elements 152, 162, 172.

Referring still to FIGS. 4-6, the actuators 206 are configured to radially translate the elongated light elements respectively along the track members 202. As shown in FIG. 4, each elongated light element may include an actuator 206 coupled to the track member 202 at the upper end, and an actuator 206 coupled to the track member 202 at the lower end of the elongated light element. The actuators 206 may be each be linear actuators. For example, each actuator 206 may comprise a drive motor 208 for rotatably driving a threaded rod 210. The upper end and the lower end of each elongated light element may be operably coupled to the threaded rod 210 such as via a ballscrew nut 212. As mentioned above, the actuators 206 of the light-element-moving system 200 may be communicatively coupled to the processor 220 which may control the operation of the drive motors 208 in a synchronized manner to effectuate radial translation of the elongated light elements during backlighting of the transparency 400 while the image regarding device records images of the transparency 400.

Referring to FIG. 5, shown is the lower end of the first elongated light element 152. As mentioned above, each of the elongated light element may be supported by a track member 202. Each drive motor 208 may be coupled to a threaded rod 210. The lower end of the first elongated light element 152 is threadably engaged to the threaded rod 210 by the ballscrew nut 212. When activated by the processor, the drive motor 208 rotates the threaded rod 210. The ballscrew nut 212 converts the rotational motion of the threaded rod 210 into linear motion for radially translating the first elongated light element 152 along the track member 202.

FIG. 6 is a sectional view of the track member 202 at the lower end of the first elongated light element 152 of FIG. 5. In the example shown, the upper end and the lower end of the first elongated light element 152 may include a post 180. The post 180 may extend through a slot 204 formed in the track member 202 for guiding the first elongated light element 152 along a radial direction. As mentioned above, the post 180 may be coupled to the ballscrew nut 212 which may be threadably engaged to the threaded rod 210 which is rotatably driven by the drive motor 208 for translating the first elongated light element 152. The upper end and the lower end of each one of the elongated light elements of any inspection system 100 configuration may be arranged in the manner shown in FIGS. 5-6. However, the light-element-moving system 200 may be configured in any one of a variety of alternative configurations for radially translating the elongated light elements, and is not limited to the arrangement shown in FIGS. 4-6.

Referring to FIG. 7, shown is an exploded view of an example of an inspection system 100 in which the housing 102 is partially shown. In this regard, the top wall 106 (FIG. 1), bottom wall 108 (FIG. 1), and end walls 104 (FIG. 1) are omitted. Shown is the outer wall 110 and an inner wall 114. The inner wall 114 may be configured as an optically transparent member to allow unobstructed transmission of light from the elongated light elements. The outer wall 110 and the inner wall 114 may optionally be included with the housing 102 such that collectively, the top wall 106, the bottom wall 108, the end walls 104, the outer wall 110, and the inner wall 114 enclose the elongated light elements and the light-element-moving system 200 to provide protection from the exterior environment. As mentioned above, the outer wall 110 may be configured as a reflector 112 to increase the intensity of light emitted by the elongated light elements. In this regard, the reflector 112 may be positioned radially outboard of the elongated light elements, and may be configured to reflect light emitted by the elongated light elements.

As an alternative to an optically transparent member, the inner wall 114 may be configured as a diffuser 116 having a desired level of light transmittance (e.g., 25-75 percent) to diffuse the light emitted by the elongated light elements and thereby increase the uniformity of the backlighting of the transparency. The diffuser 116 may be positionable between the first rounded array and the transparency 400, and configured to substantially uniformly diffuse light emitted by the elongated light elements. The diffuser 116 may be contoured or shaped complementary to the cross-sectional shape of the transparency 400. Although shown as having a simply curved shape, the diffuser 116 may be formed in a complex or contoured shape complementary to the shape or contour of the transparency surface. The diffuser 116 may be fabricated of a glass material and/or a polymeric material having a desired level of light transmittance. In this regard, the diffuser 116 may eliminate or reduce the occurrence of bright spots in the light emitted by the elongated light elements.

Also shown in FIG. 7 is an example of an image recording device 300 configured as a line scanning panoramic camera 306 shown mounted on the above-described fixture 250. The panoramic camera 306 is rotatable about an axis of rotation 308 for recording a horizontal field of view 418 (FIG. 2) of the transparency 400 (FIG. 4). The panoramic camera 306 may have a wide angle lens having a vertical field of view 416 capable of encompassing the upper edge 410 (FIG. 4) and the lower edge 412 (FIG. 4) of the transparency 400 which is shown supported on the fixture 250. The panoramic camera 306 may be capable of recording a 360 degree panoramic image of the transparency 400. Inspection of the transparency 400 may be performed using the panoramic camera 306 by rotating the image recording device 300 about the axis of rotation 308 while recording images of the transparency 400 prior to, during, and after the elongated light elements are radially translated as described in greater detail below.

Referring now to FIGS. 8A-13F, shown are several examples of inspection systems 100 for radially translating the rounded arrays while backlighting the transparency 400 during the recording of images by the image recording device 300. The examples each include first, second, and third rounded arrays 150, 160, 170 respectively containing first, second, and third elongated light elements 152, 162, 172. However, as indicated above, an inspection system 100 may include any number of rounded arrays including only two rounded arrays or more than three rounded arrays. In each of the disclosed examples, the first elongated light elements 152 are initially positioned radially inboard of the second elongated light elements 162. It should also be noted that although each of the inspection systems 100 in FIGS. 9A-13F contains four (4) to ten (10) of the first, second, and/or third elongated light elements 152, 162, 172 respectively in each of the first, second, and third rounded arrays 150, 160, 170, any number of first, second, and third elongated light elements 152, 162, 172 may be respectively included in each of the first, second, and third elongated light elements 152, 162, 172. For example, an inspection system (not shown) may include more than four (4) or five (5) first and second elongated light elements 152, 162 and more than ten (10) third elongated light elements 172. In this regard, larger-diameter or larger-radius transparencies may require larger numbers of elongated light elements respectively in each of the rounded arrays to enable uniform backlighting of the transparency. Further in this regard, the width of the elongated light elements may be a function of the size (e.g., radius or diameter) of the transparency. For example, a transparency having a relatively large radius of curvature may allow the use of elongated light elements that are wider than elongated light elements for inspecting transparencies of relatively small radius of curvature.

Referring to FIGS. 8A-8C, shown is an example of an inspection system 100 having arc-shaped arrays 120 (FIG. 8A). The third elongated light elements 172 are stationary, and only the first and second elongated light elements 152, 162 are configured to radially translate. As described above, each of the first elongated light elements 152 and each of the second elongated light elements 162 may be supported by a track member 202 (FIG. 4) on each of the upper end and the lower end of the first and second elongated light elements 162. FIGS. 8A-8C show each actuator 206 as described above and configured as a drive motor 208 having a threaded rod 210 located at the upper end and also at the lower end of each of the first and second elongated light elements 152, 162. The processor 220 (FIG. 4) may control the operation of the actuators 206 to cause radial translation of the elongated light elements in a synchronized manner as described below.

In FIGS. 8A-8C, prior to radial translation of the first and second elongated light elements 152, 162, the second rounded array 160 of the second elongated light elements 162 are positioned at a second radial location 164 (FIG. 8A) defining a plurality of light element gaps 184 respectively between adjacent pairs of the second elongated light elements 162. In FIG. 8A, the first elongated light elements 152 may be contiguous with each other (e.g., are contacting). The third rounded array 170 of the third elongated light elements 172 are statically positioned at a third radial location 174 at which the third elongated light elements 172 are non-contiguous with (e.g., are non-contacting) the second elongated light elements 162. The third elongated light elements 172 define the plurality of light element gaps 184.

In FIGS. 8A-8C, the light-element-moving system 200 (FIGS. 4-6) may radially translate the first elongated light elements 152 from the first radial location 154 to the second radial location 164 until each of the first elongated light elements 152 is positioned within one of the light element gaps 184 between adjacent pairs of the second elongated light elements 162, at which point the second radial location 164 may include alternating first and second elongated light elements 152, 162. Once the first elongated light elements 152 are at the second radial location 164, the light-element-moving system 200 may simultaneously translate the first and second elongated light elements 152, 162 from the second radial location 164 to the third radial location 174 until each of the first and second elongated light elements 152, 162 is positioned within one of the light element gaps 184 between adjacent pairs of the third elongated light elements 172. In some examples, radial translation of the first elongated light elements 152 to the second radial location 164 and radial translation of the first and second elongated light elements 152, 162 to the third radial location 174 may be a continuous motion with no stoppage during the translation of the first elongated light elements 152 from the first radial location 154 to the third radial location 174. In FIGS. 8A-8C, all of the first elongated light elements 152 may be radially translated at the same velocity as each other, and all of the second elongated light elements 162 may be radially translated at the same velocity as each other for uniform backlighting of the transparency 400 during radial translation. The first elongated light elements 152 may be radially translated at either the same velocity or at a different velocity than the velocity of radial translation of the second elongated light elements 162.

Referring to FIGS. 9A-13F, shown are examples of the inspection system 100 in which each of the rounded arrays is a circular-shaped array as may be implemented for inspecting a transparency 400 (not shown) that may be positioned within the area surrounded by the first rounded array 150. In FIGS. 9A-13F, the first elongated light elements 152 are shown in solid font. The second elongated light elements 162 are shown in dashed font. The third elongated light elements 172 are shown in phantom font. The arrangement and movement of the circular-shaped arrays of FIGS. 9A-13F may be applied to an arrangement of arc-shaped arrays 120 such as the examples shown in FIGS. 1-4 and 7-8C. The rounded arrays in any one of the examples of FIGS. 9A-13F may be radially translated by a light-element-moving system 200 (e.g., FIGS. 4-6) such as the above-described example of the light-element-moving system 200 shown in FIGS. 4-6 or via an alternative light-element-moving system configuration.

Figure 9A:
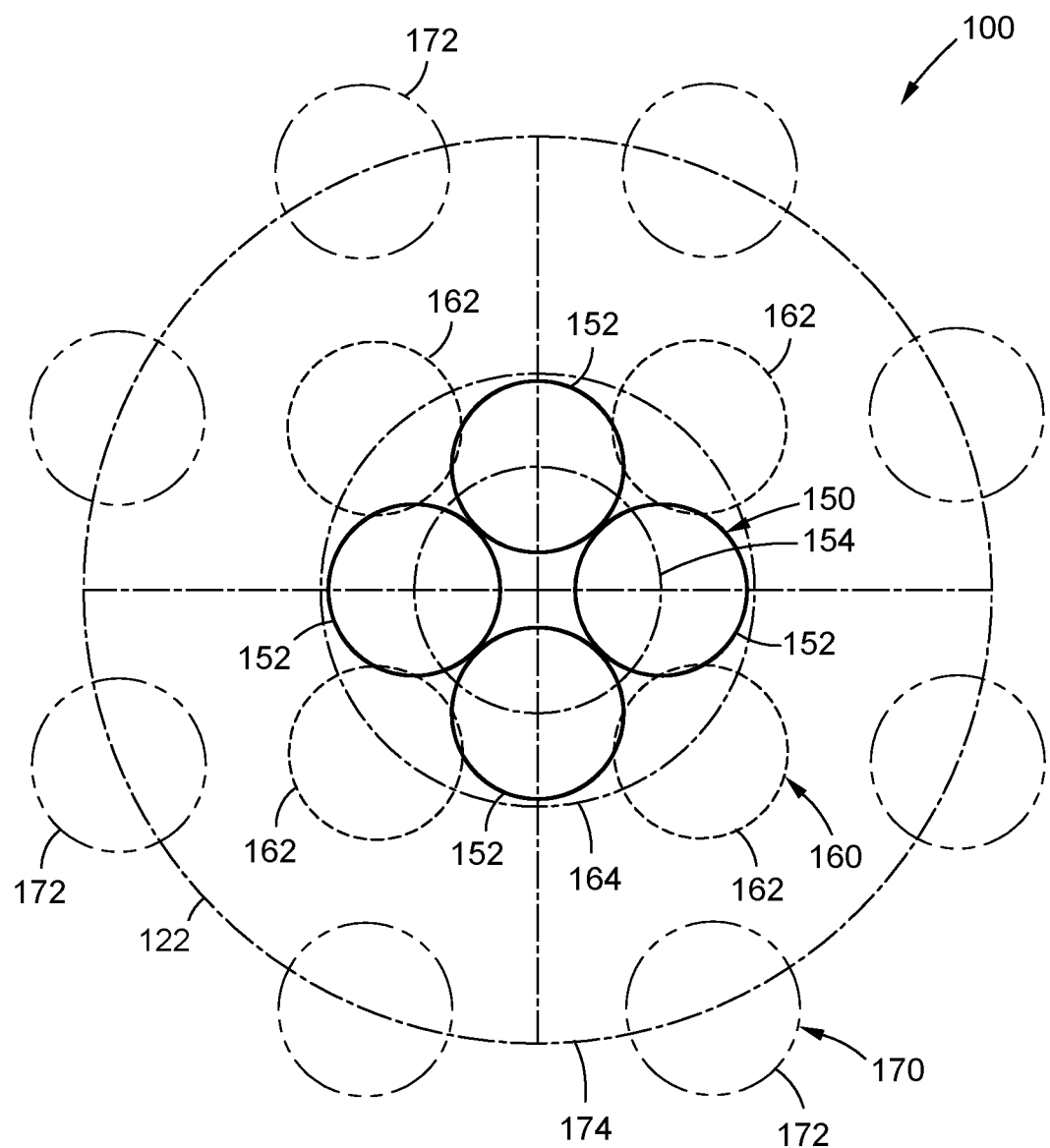
FIGS. 9A, 9B and 9C are schematic views of an inspection system having circular arrays of elongated light elements radially translating in a manner similar to the sequence shown in FIGS. 8A-8C.
Figure 9B:
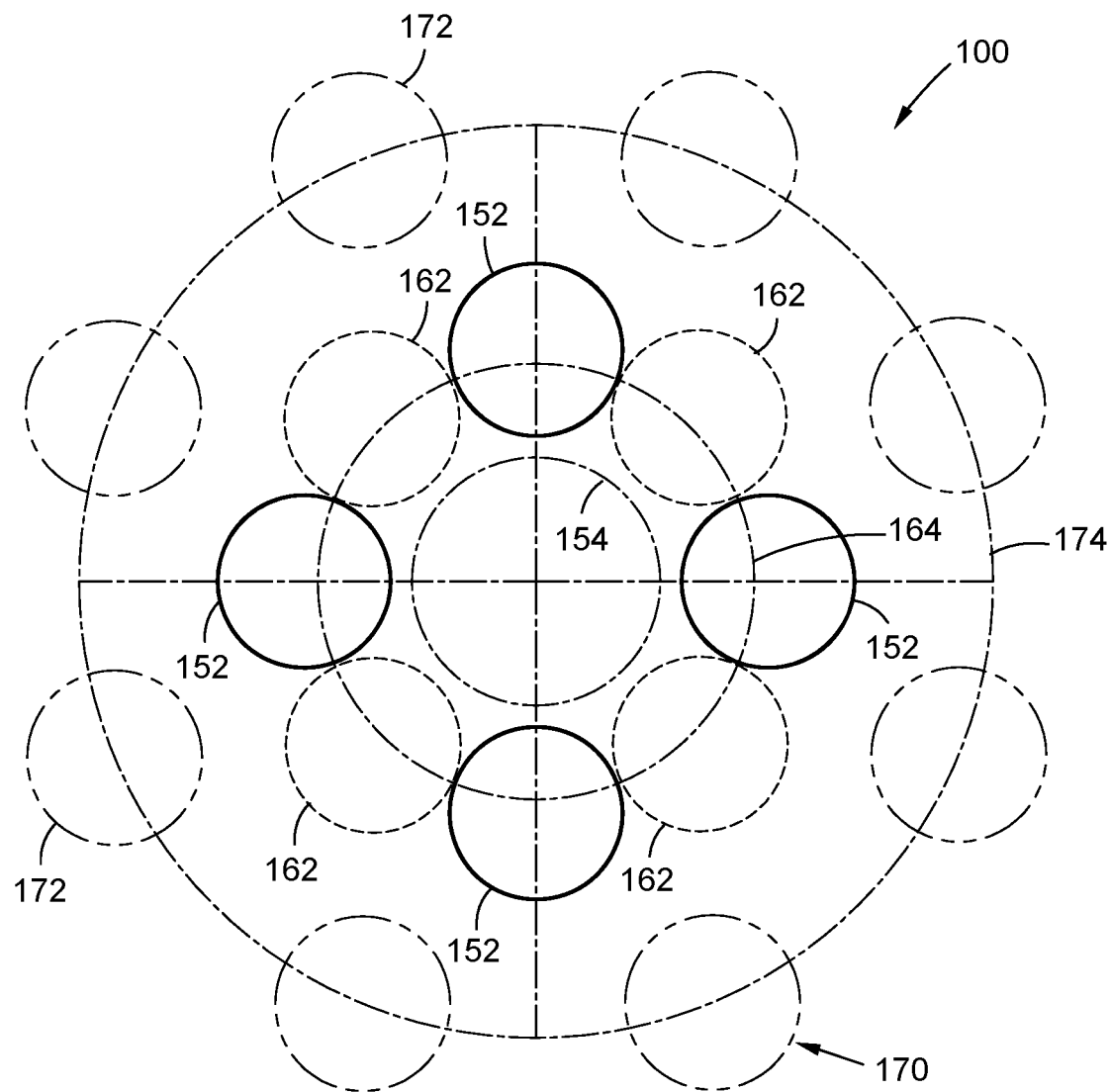
Figure 9C:
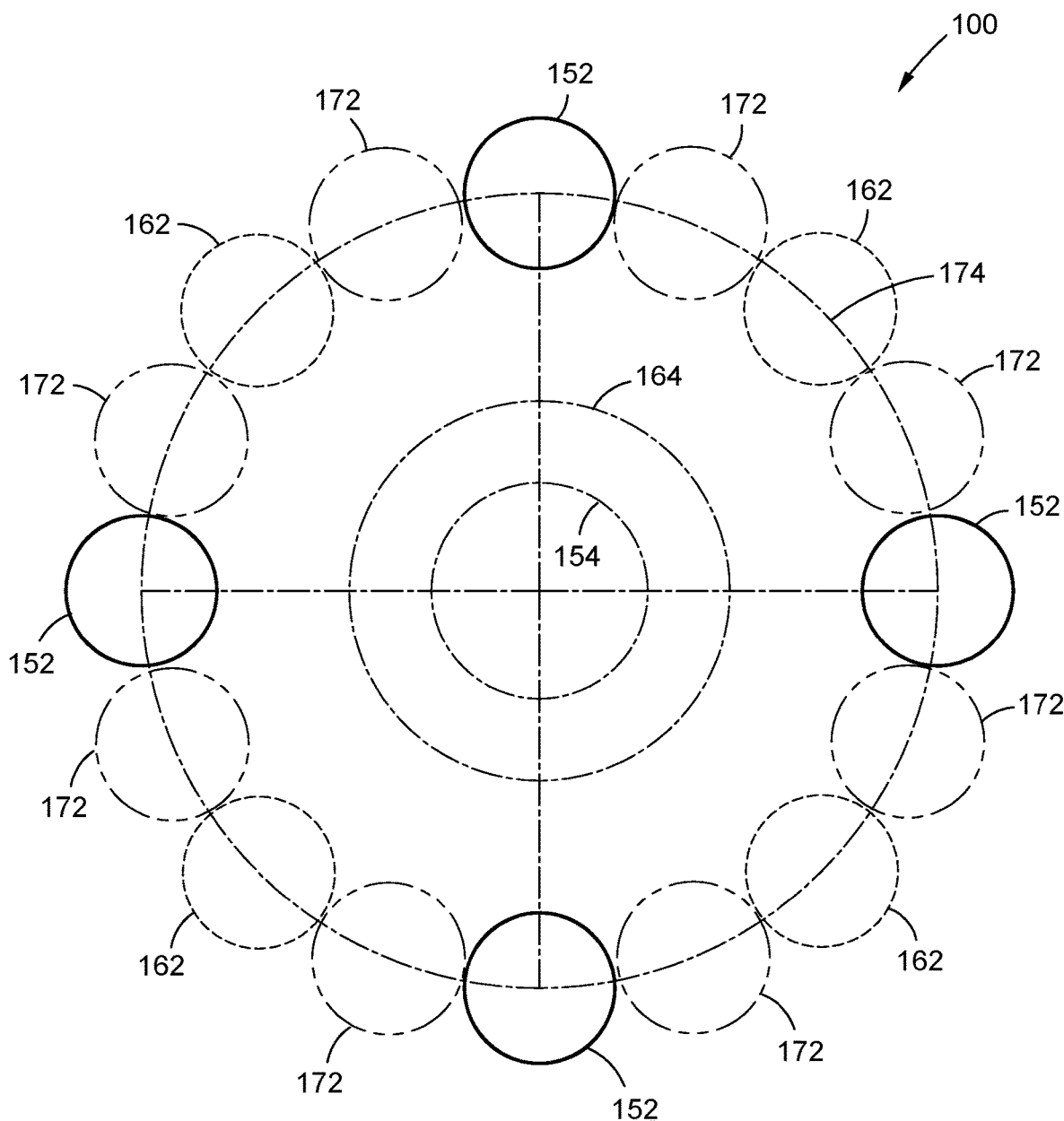

Referring to FIGS. 9A-9C, shown is an example of an inspection system 100 having rounded arrays that are translated in a movement scheme similar to the above-described movement scheme of rounded arrays shown in FIGS. 8A-8C. FIG. 9A shows the first elongated light elements 152 initially (e.g., prior to radial translation) contiguous with each other, and the second elongated light elements 162 contiguous with (e.g., contacting) the first elongated light elements 152. FIG. 9B shows the first elongated light elements 152 after radial translation from the first radial location 154 to the second radial location 164 in which each one of the first elongated light elements 152 is positioned within the light element gap 184 (FIG. 1) between a pair of second elongated light elements 162 (FIG. 1). FIG. 9C shows the first and second elongated light elements 152, 162 at the third radial location 174 after being radially translated from the second radial location 164. As mentioned above, in any one of the examples disclosed herein, each light element gap 184 between a pair of second elongated light elements 162 has a gap width 186 (FIG. 1) that is at least as large as the light element width 182 of a first elongated light element 152. Likewise, each light element gap 184 between a pair of third elongated light elements 172 has a gap width 186 that is at least as large as the light element width 182 of a first elongated light element 152 and a second elongated light element 162.

Figure 10A:
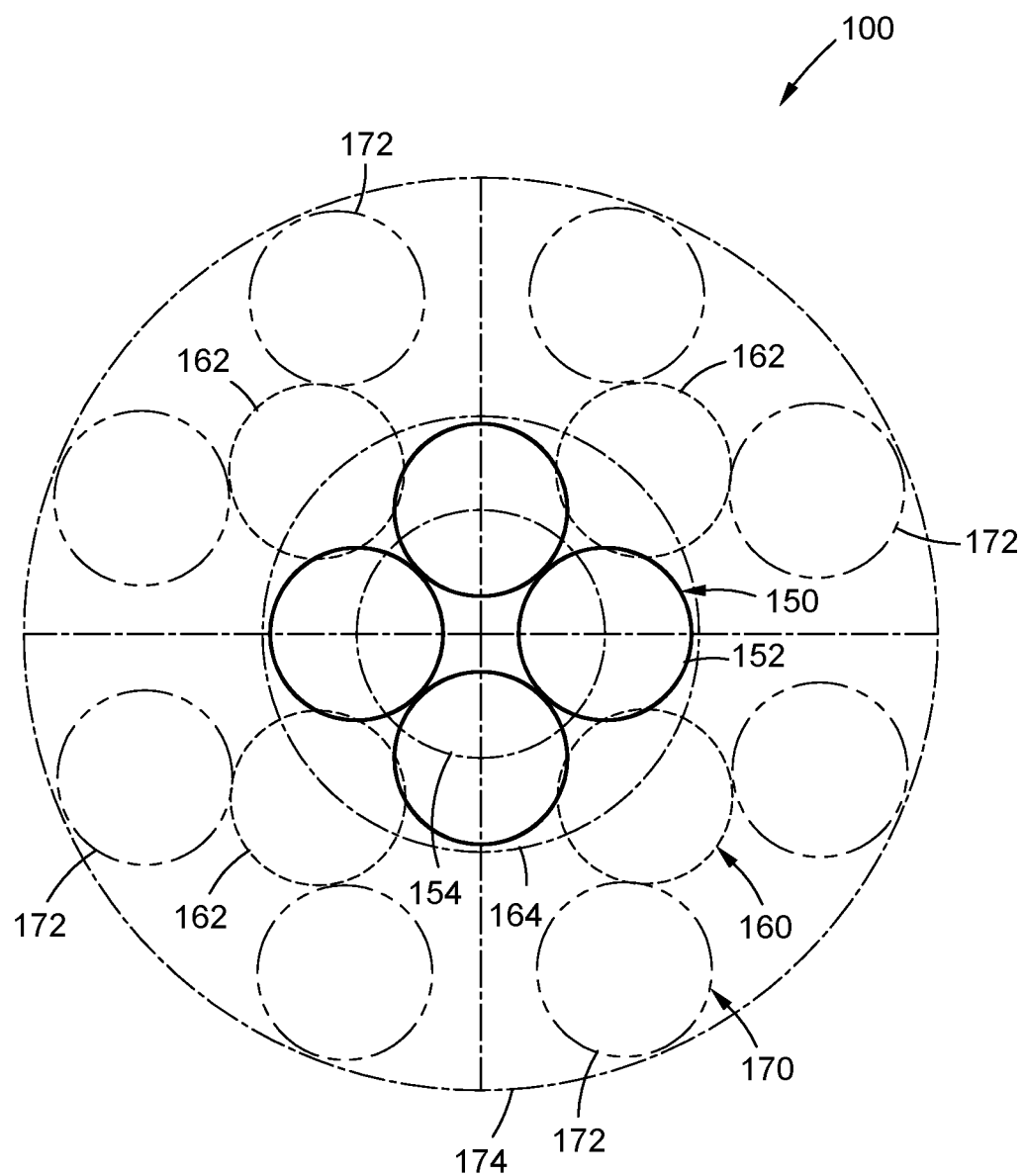
FIGS. 10A, 10B, 10C and 10D are schematic views of an inspection system having circular arrays of elongated light elements and illustrating an example of a sequence of radially translating elongated light elements in which the third elongated light elements are initially contiguous with the second elongated light elements, and the first, second, and third elongated light elements start to radially translate toward a third radial location once the first elongated light elements have radially translated to the second radial location.
Figure 10B:
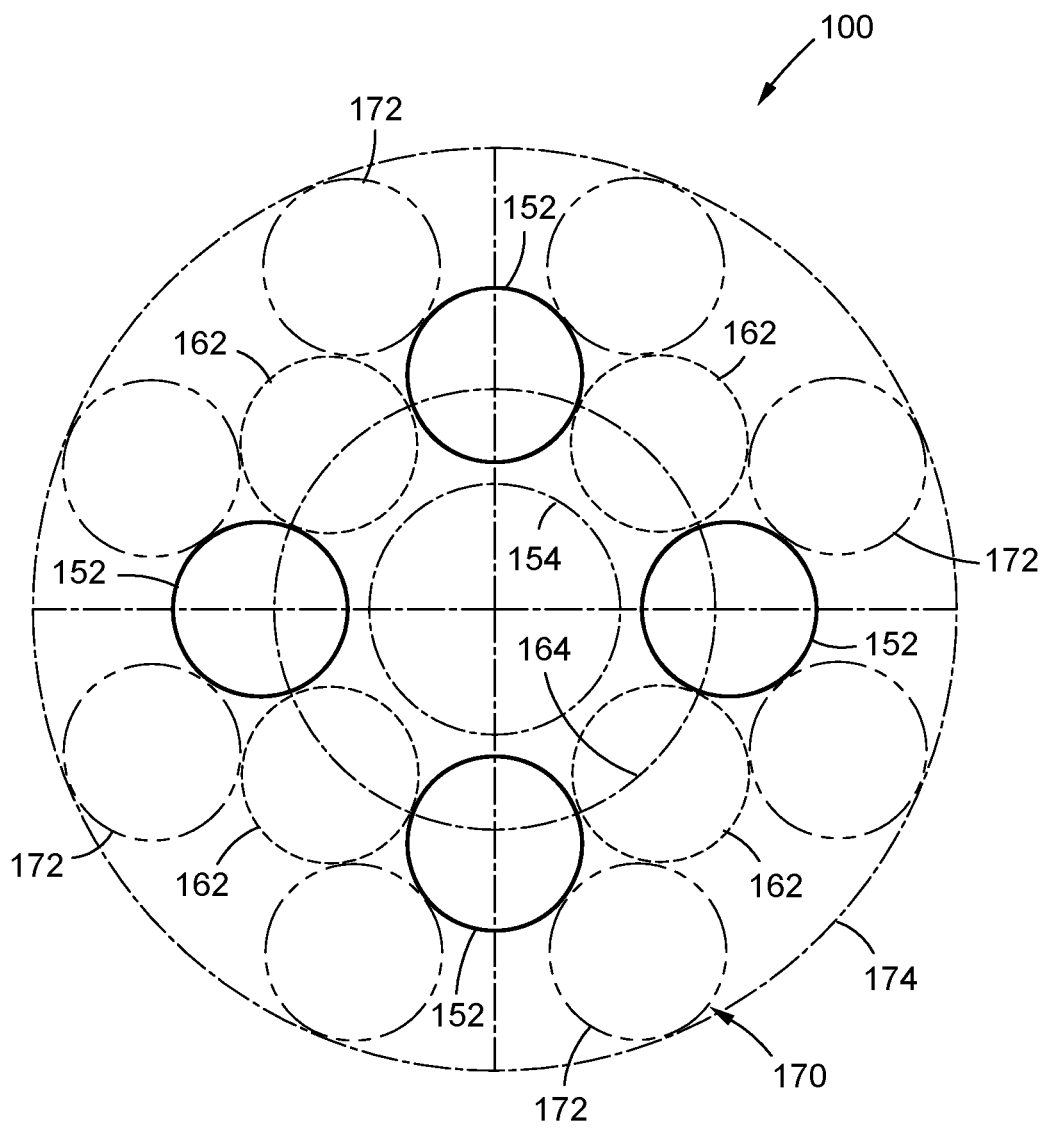

Referring to FIGS. 10A-10D, shown is an example of an inspection system 100 in which, prior to radially outward translation of the first and second elongated light elements 152, 162 (e.g., in FIG. 10A), the second elongated light elements 162 are positioned at a radial location (e.g., at a second radial location 164) at which each of the second elongated light elements 162 is contiguous with a pair of the first elongated light elements 152. In addition, the second elongated light elements 162 define a plurality of light element gaps 184 respectively between adjacent pairs of the second elongated light elements 162. Also, the third elongated light elements 172 are positioned at a radial location at which each of the second elongated light elements 162 is contiguous with a pair of the third elongated light elements 172. As shown in FIGS. 10A-10B, the light-element-moving system 200 (e.g., FIGS. 1-2 and 4-6) is configured to hold the second elongated light elements 162 in a static position (e.g., at the second radial location 164), and radially translate the first elongated light elements 152 from the first radial location 154 to the second radial location 164 until each of the first elongated light elements 152 is positioned within one of the light element gaps 184 (FIG. 1) between adjacent pairs of the second elongated light elements 162, and such that each of the third elongated light elements 172 is contiguous with one of the first elongated light elements 152 and one of the second elongated light elements 162 provide homogenous backlighting for the transparency 400.

Figure 10C:
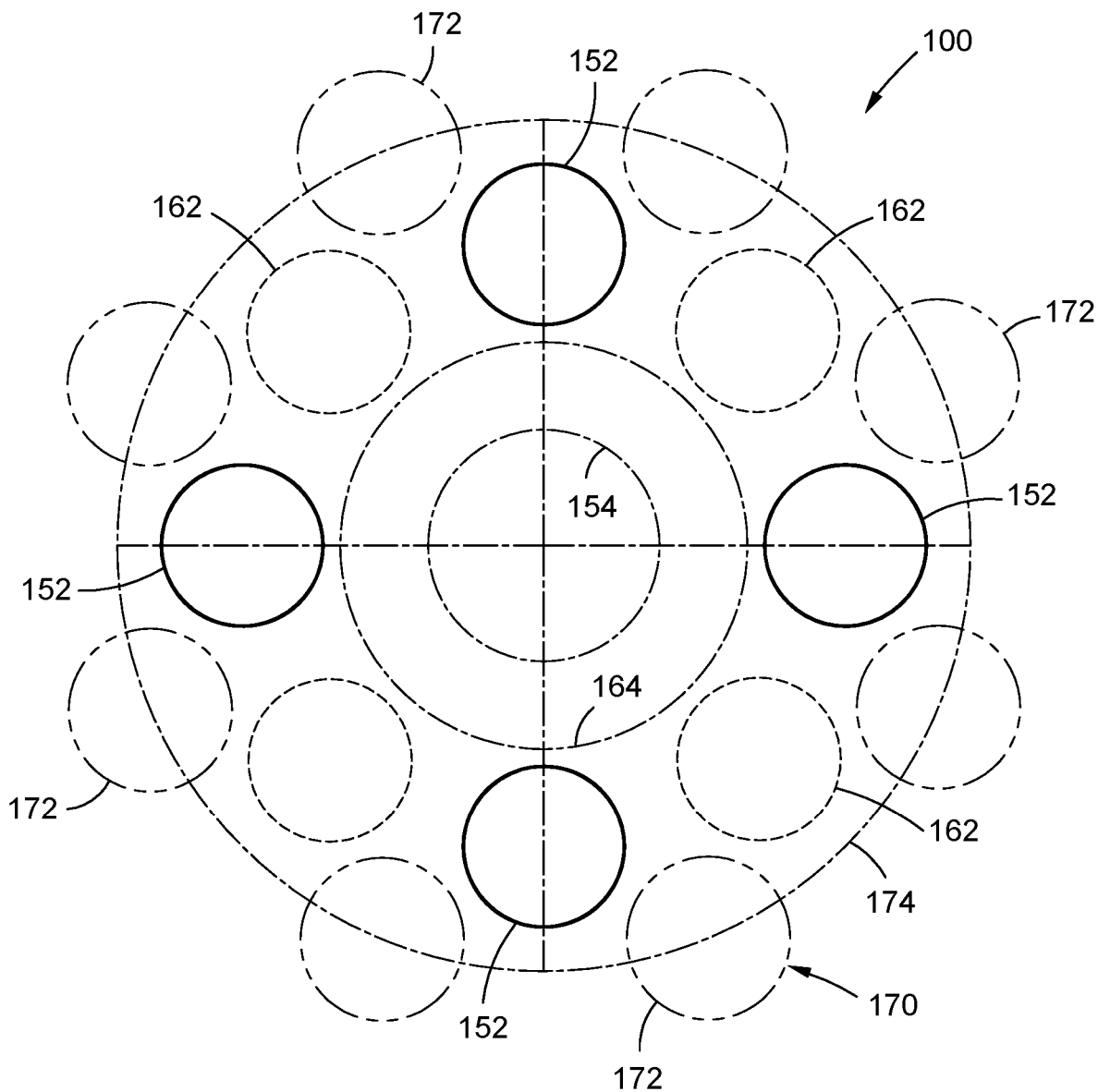
Figure 10D:
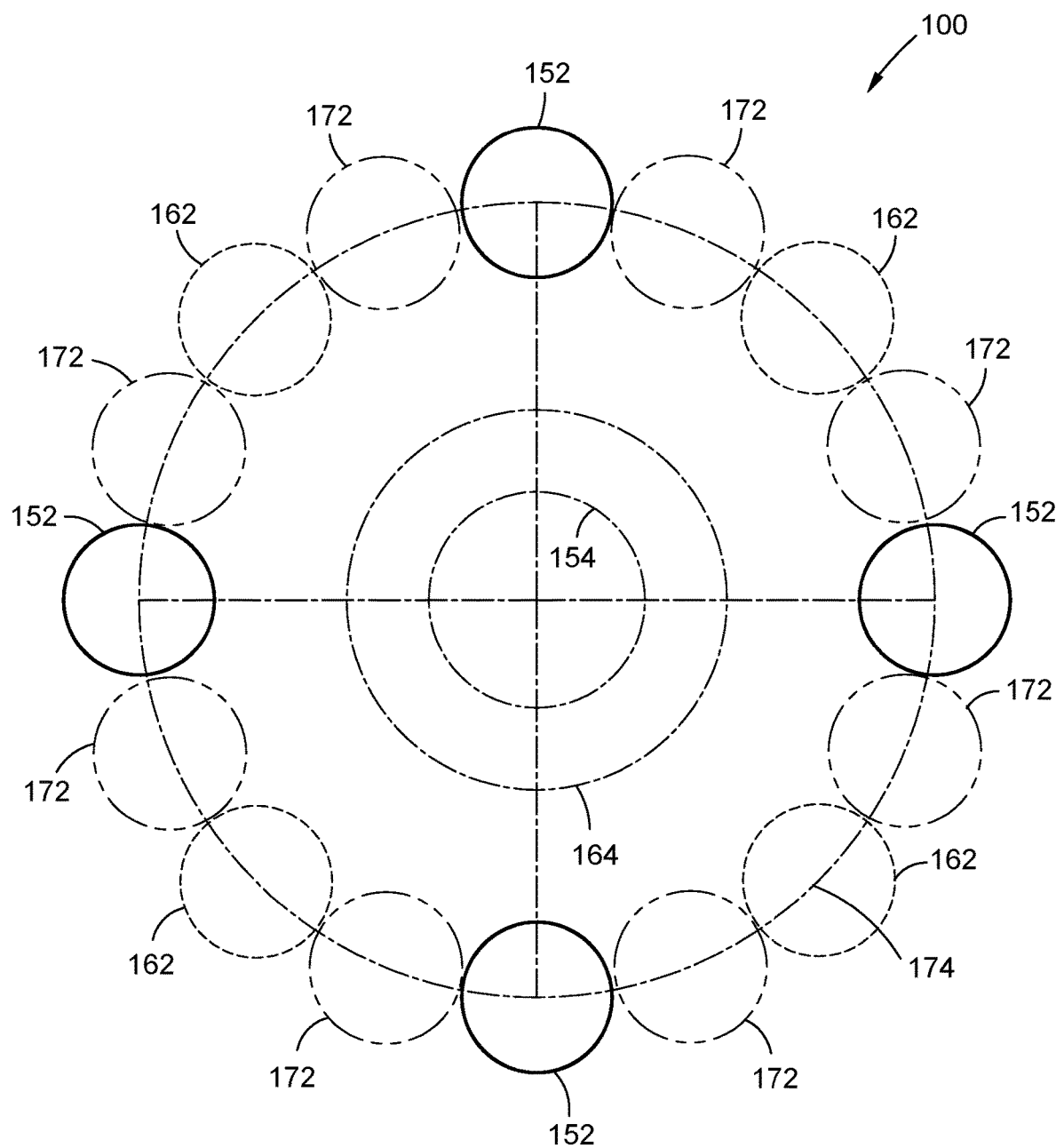

As shown in FIGS. 10B-10D, the light-element-moving system 200 is configured to simultaneously radially translate the first, second, and third elongated light elements 152, 162, 172 at the same velocity toward a third radial location 174 until each of the first and second elongated light elements 152, 162 is positioned within one of a plurality of light element gaps 184 respectively between adjacent pairs of the third elongated light elements 172 at the third radial location 174. As shown in FIG. 10D, the first, second, and third elongated light elements 152, 162, 172 are contiguous at the third radial location 174. In the example of FIGS. 10A-10D, due to radial translation of the first, second, and third elongated light elements 152, 162, 172 at the same velocity, the third elongated light elements 172 reach the third radial location 174 before the first and second elongated light elements 152, 162 reach the third radial location 174. In FIGS. 10A-10D, all of the first elongated light elements 152 are radially translated at the same velocity as each other, all of the second elongated light elements 162 are radially translated at the same velocity as each other, and all of the third elongated light elements 172 are radially translated at the same velocity as each other. In addition, the first, second, and third elongated light elements 152, 162, 172 are radially translated at the same velocity.

Referring to FIGS. 11A-11E, shown is an example of an inspection system 100 in which, prior to radial translation of the elongated light elements, the rounded arrays are initially arranged in a manner similar to the arrangement shown in FIG. 10A in which each of the second elongated light elements 162 is contiguous with a pair of the first elongated light elements 152, and each of the second elongated light elements 162 is contiguous with a pair of the third elongated light elements 172. As shown in FIGS. 11A-11E, the light-element-moving system 200 simultaneously radially translates the first, second, and third elongated light elements 152, 162, 172 at the same velocity toward the third radial location 174 until each of the first and second elongated light elements 152, 162 is positioned within one of a plurality of light element gaps 184 respectively defined between adjacent pairs of the third elongated light elements 172 at the third radial location 174. The first, second, and third elongated light elements 152, 162, 172 are contiguous at the third radial location 174. However, the first, second, and third elongated light elements 152, 162, 172 are non-contiguous shortly after radial translation has started. The first, second, and third elongated light elements 152, 162, 172 start moving at the same time and at the same velocity to arrive at the third radial location 174 at different times. As a result, the third elongated light elements 172 reach the third radial location 174 before the first and second elongated light elements 152, 162. In addition, the second elongated light elements 162 reach the third radial location 174 before the first elongated light elements 152.

Figure 11A:
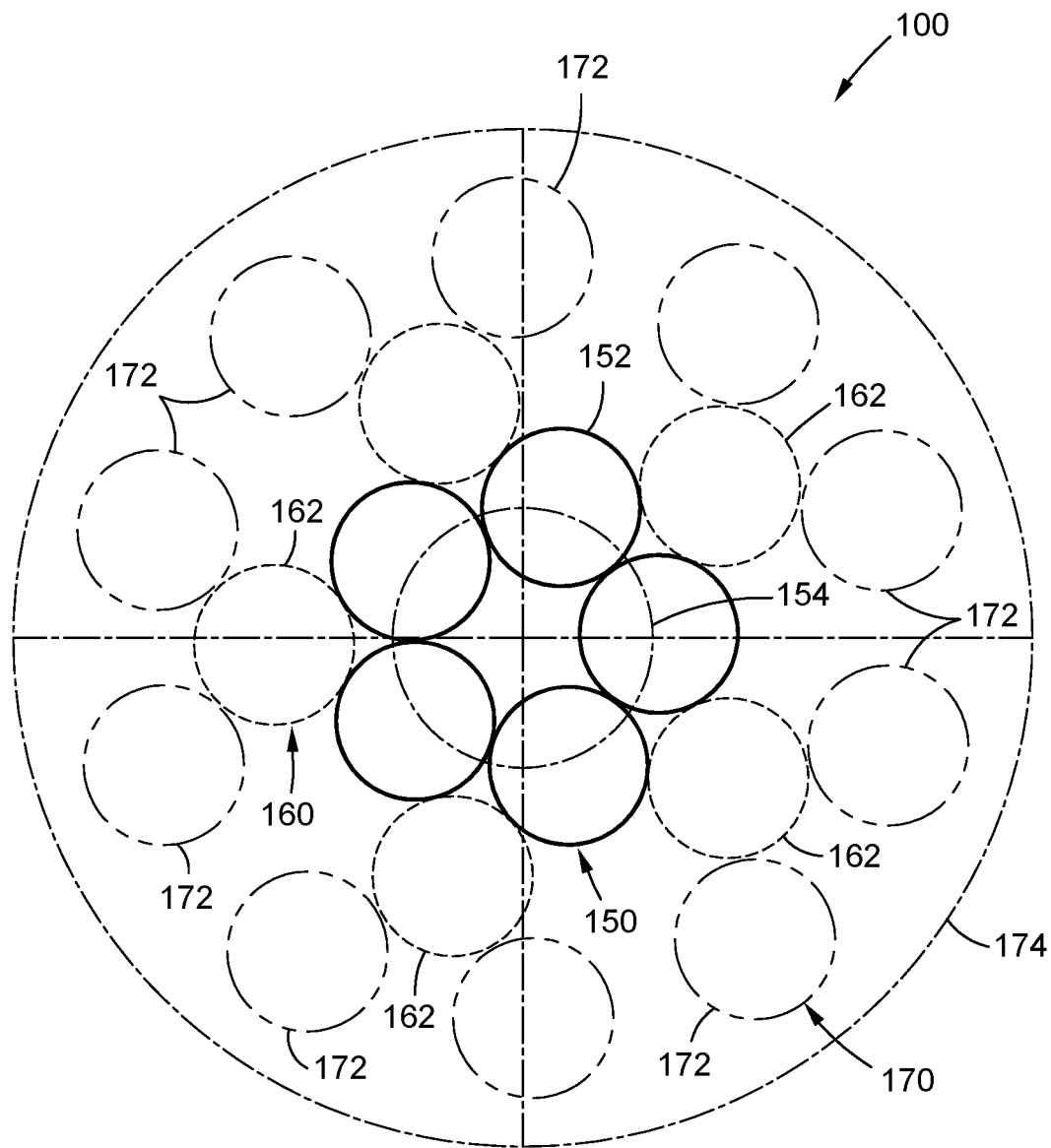
FIGS. 11A, 11B, 11C, 11D and 11E are schematic views of an inspection system having circular arrays of elongated light elements and illustrating an example of a sequence of radially translating elongated light elements in which the third elongated light elements are initially contiguous with the second elongated light elements, and the first, second, and third elongated light elements radially translate toward the third radial location at the same velocity.
Figure 11B:
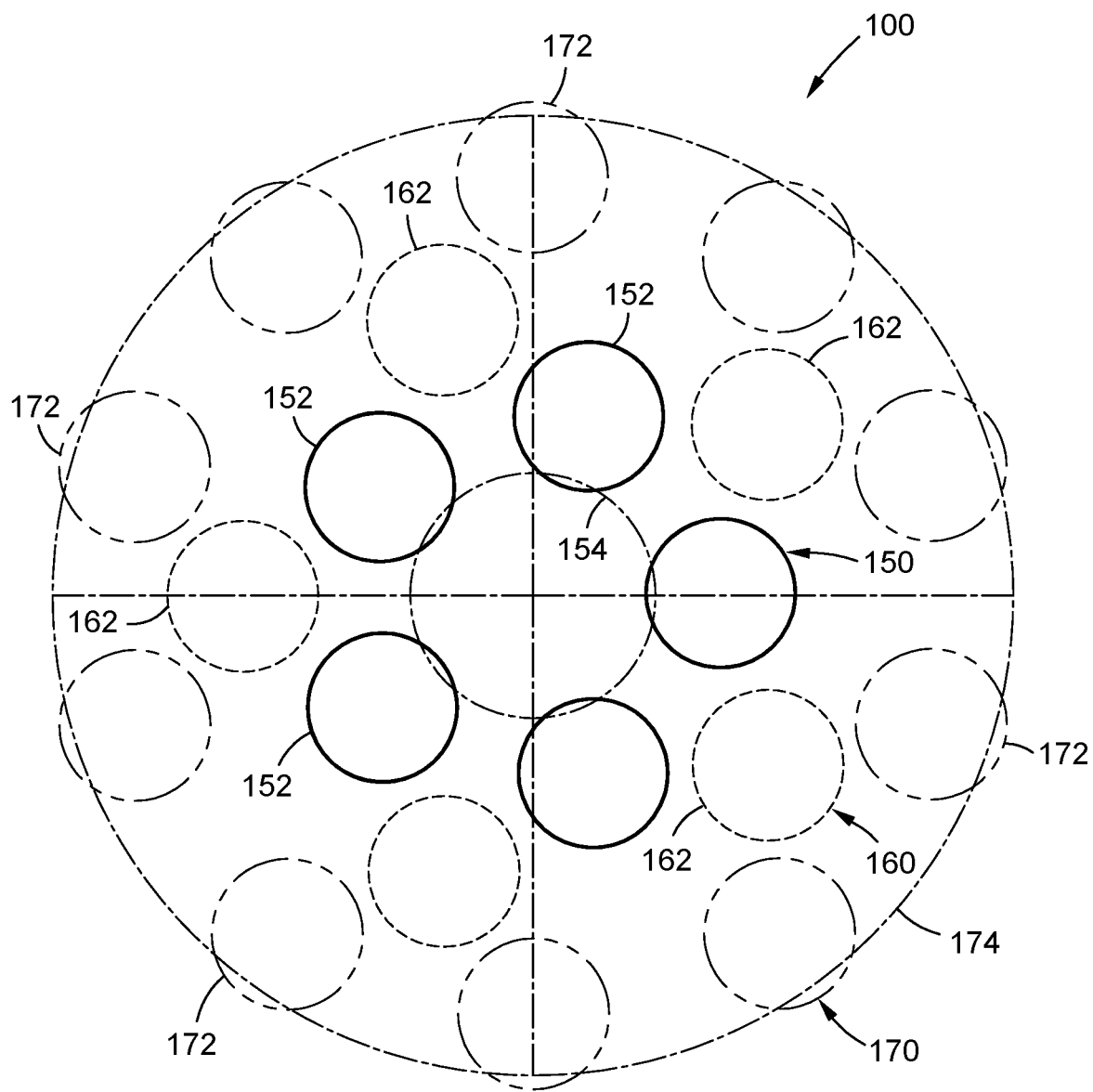
Figure 11C:
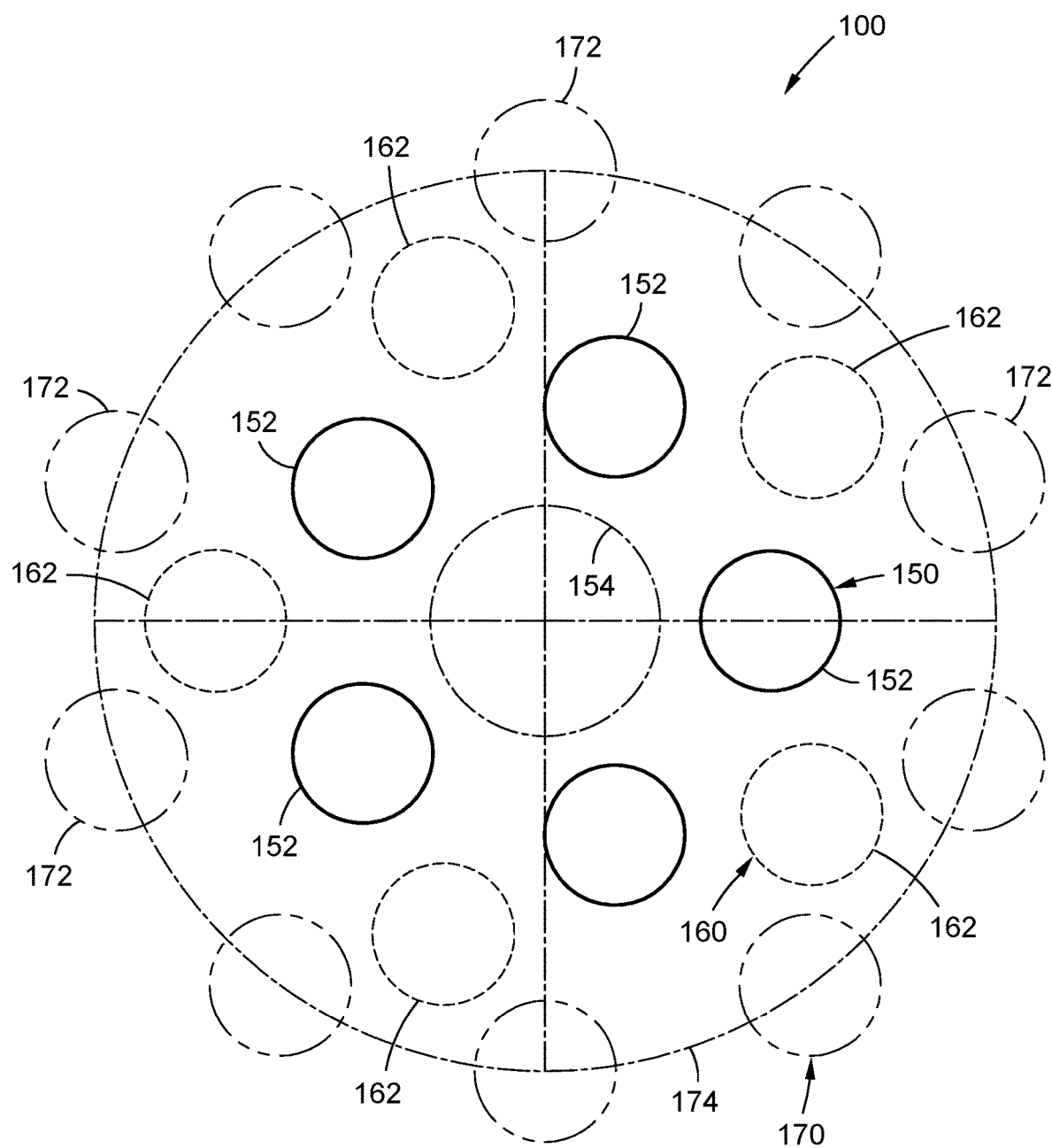
Figure 11D:
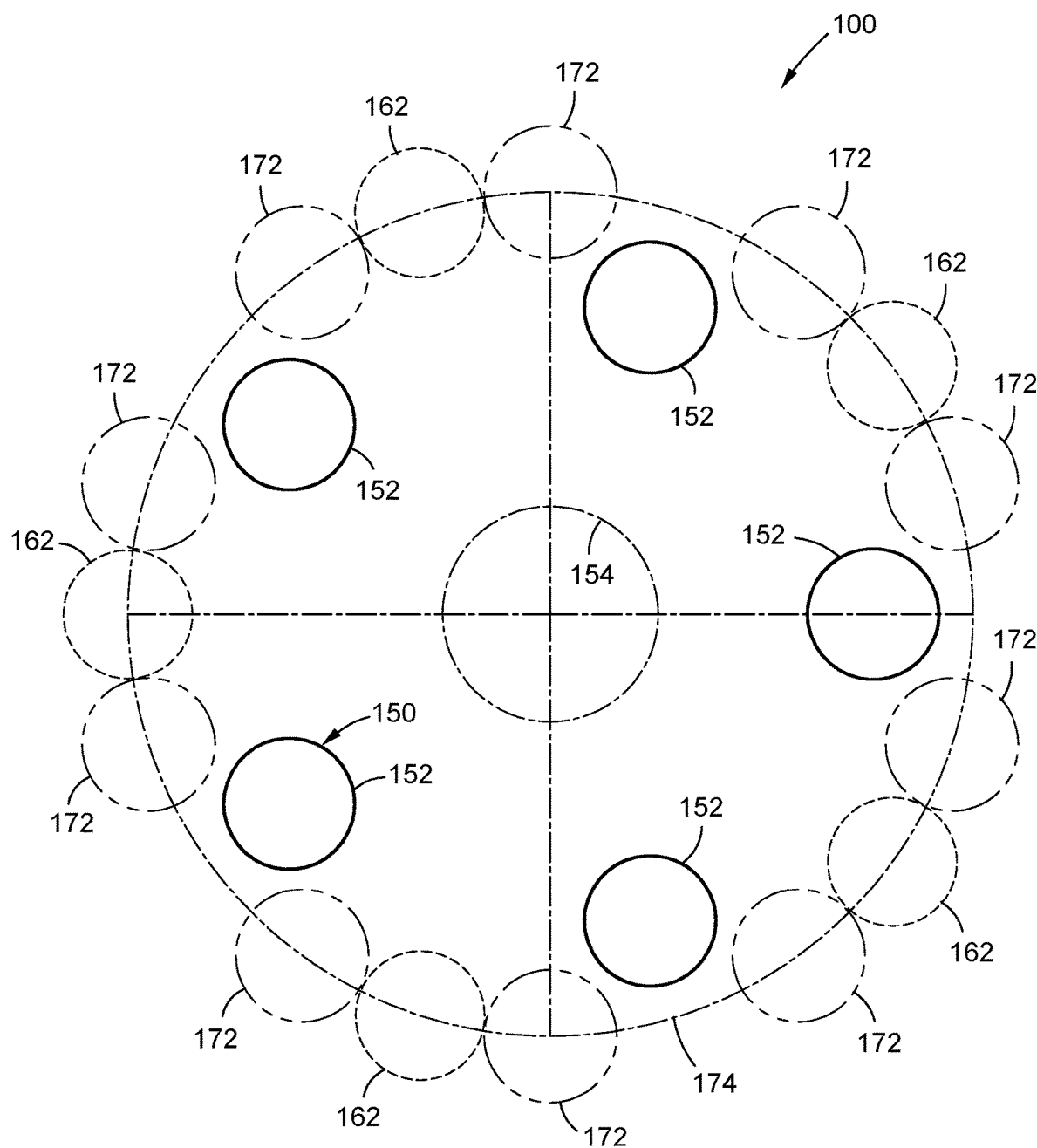
Figure 12A:
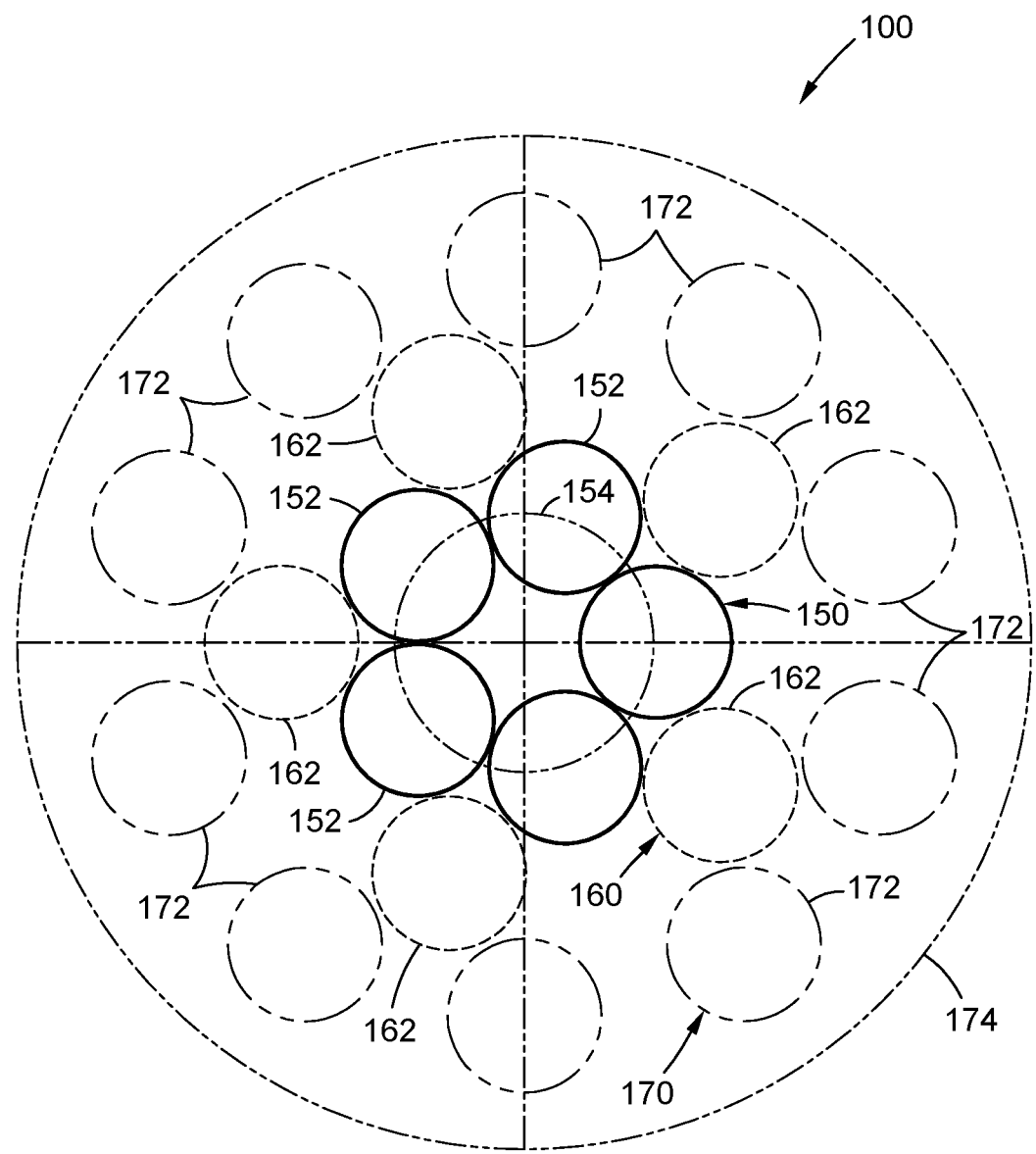
FIGS. 12A, 12B, 12C, 12D and 12E are schematic views of an inspection system having circular arrays of elongated light elements and illustrating an example of a sequence of radially translating elongated light elements in which the third elongated light elements are initially contiguous with the second elongated light elements, and the first, second, and third elongated light elements start to radially translate toward the third radial location at different velocities such that the first, second, and third elongated light elements arrive at the third radial location at the same time.
Figure 12B:
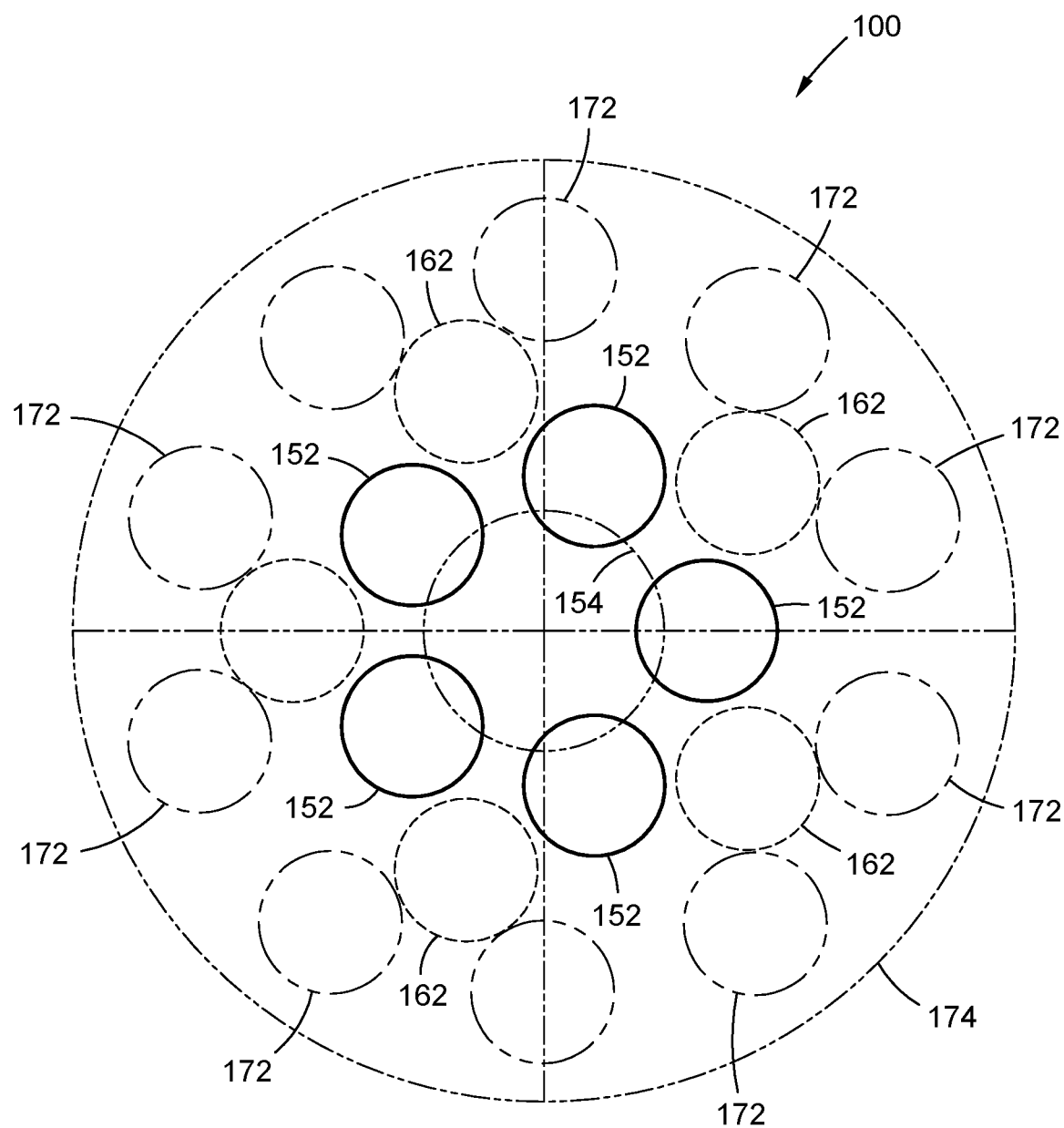
Figure 12C:
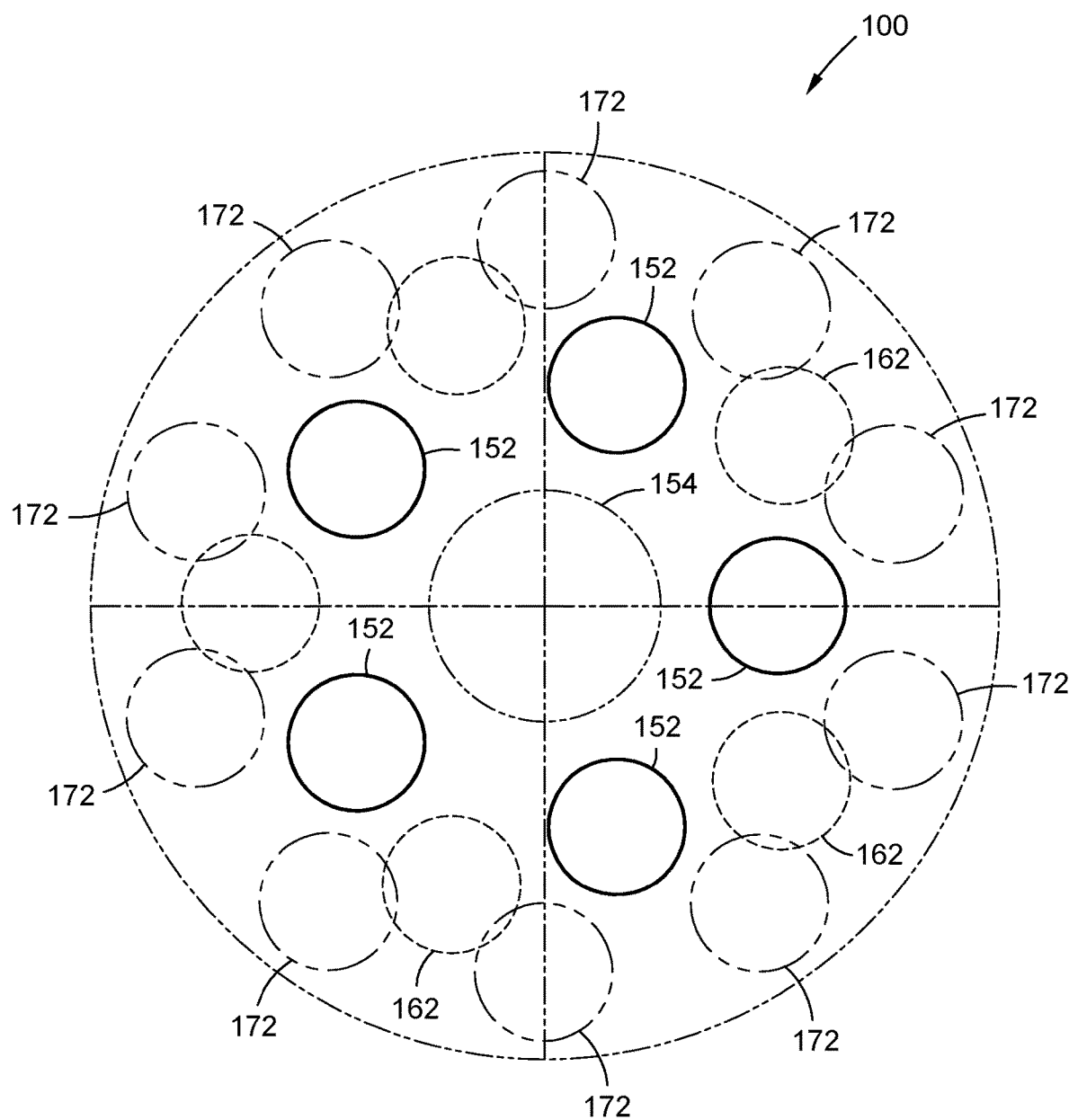
Figure 12D:
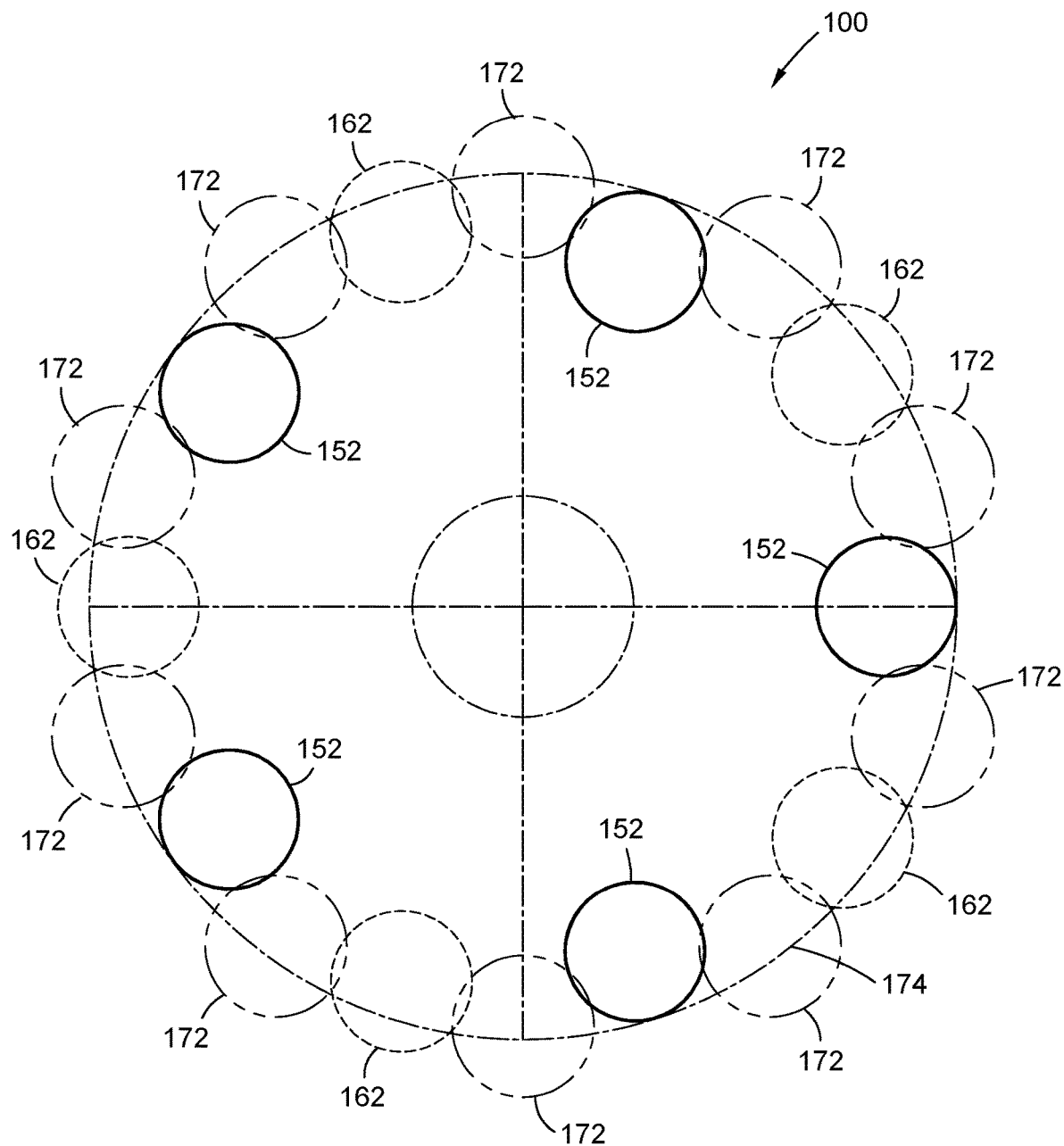

Referring to FIGS. 12A-12E, shown is an example of an inspection system 100 in which, prior to radial translation of the elongated light elements, the rounded arrays are initially arranged in a manner similar to the above-described arrangement shown in FIG. 11A. The light-element-moving system 200 is configured to start moving the first, second, and third elongated light elements 152, 162, 172 at the same time, and simultaneously radially translate the first, second, and third elongated light elements 152, 162, 172 at different velocities toward the third radial location 174 such that the first, second, and third elongated light elements 152, 162, 172 reach the third radial location 174 at the same time. At the third radial location 174, each of the first and second elongated light elements 152, 162 is positioned within one of the light element gaps 184 defined between adjacent pairs of the third elongated light elements 172. The first, second, and third elongated light elements 152, 162, 172 are contiguous at the third radial location 174. Although FIGS. 12C-12D shows some overlap between the first, second, and third elongated light elements 152, 162, 172 during the translation toward the third radial location 174, the first, second, and third elongated light elements 152, 162, 172 may be provided in sizes that prevent contact between the adjacent elongated light elements.

Figure 13A:
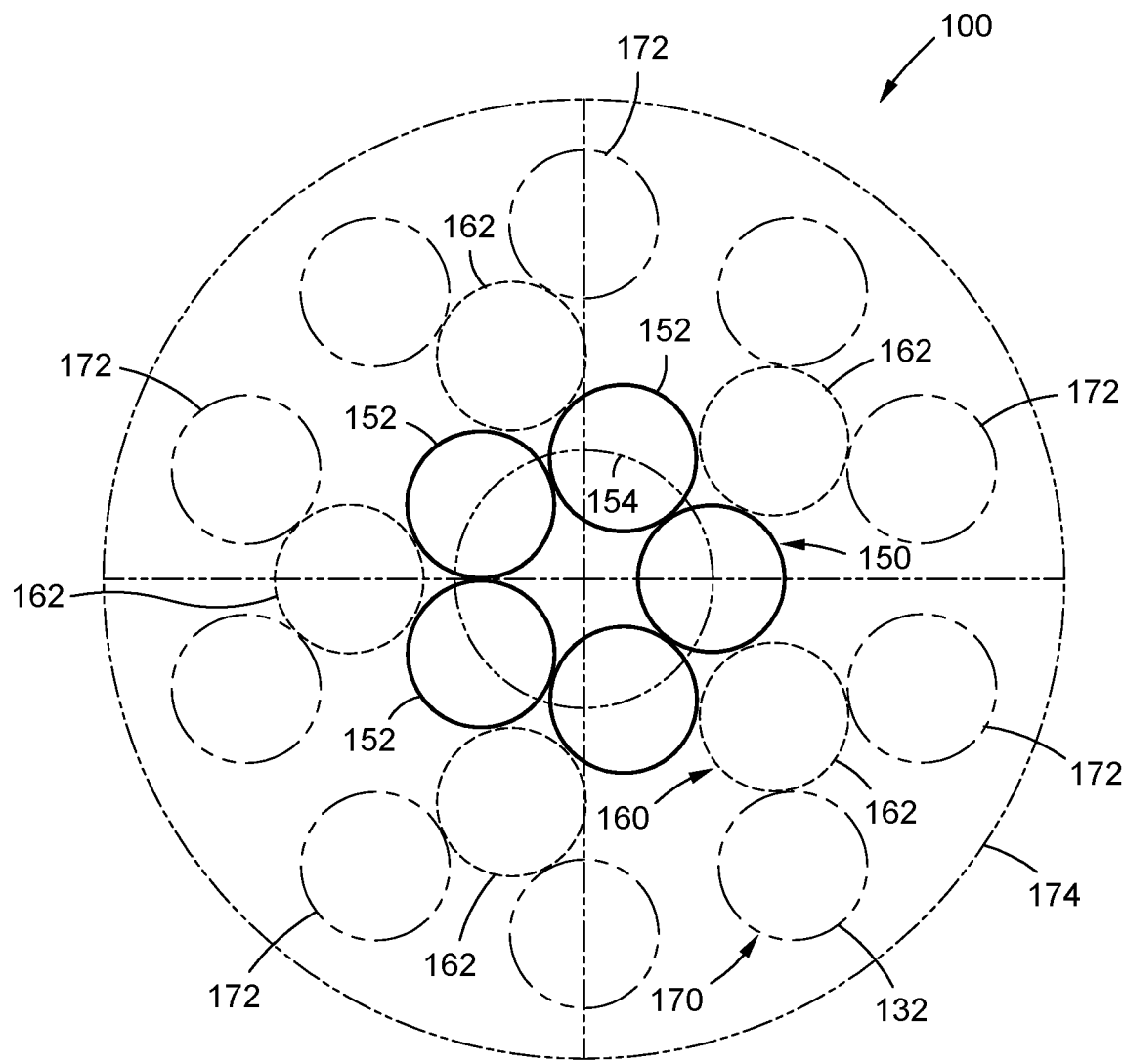
FIGS. 13A, 13B, 13C, 13D, 13E, and 13F are schematic views of an inspection system having circular arrays of elongated light elements and illustrating an example of a sequence of radially translating elongated light elements in which the third elongated light elements are initially contiguous with the second elongated light elements, and the first, second, and third elongated light elements start to radially translate toward the third radial location in a manner to maintain contiguity of the second elongated light elements with the third elongated light elements, and maintain contiguity of the second elongated light elements with the first elongated light elements while the first, second, and third elongated light elements radially translate to the third radial location.
Figure 13B:
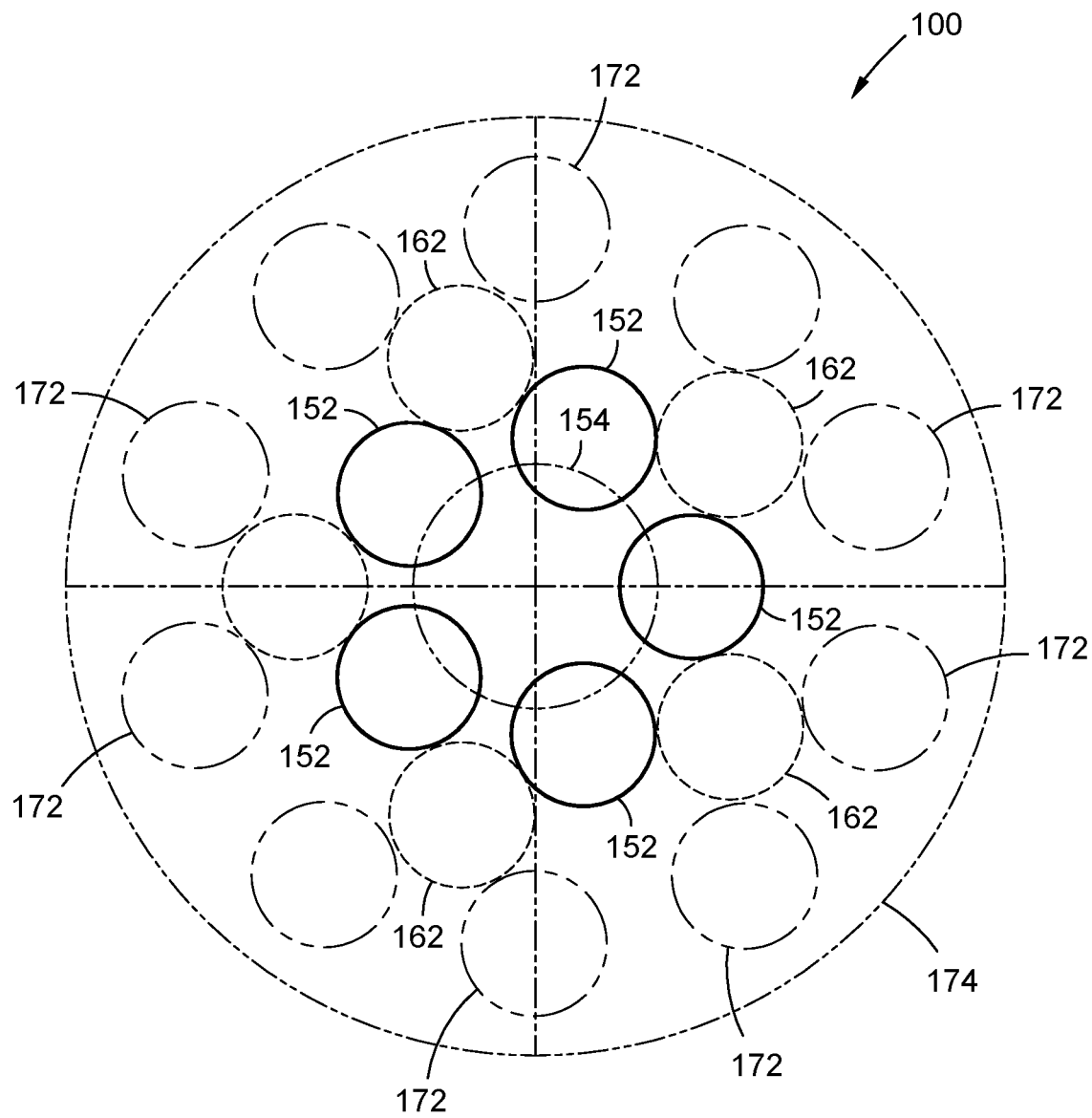
Figure 13C:
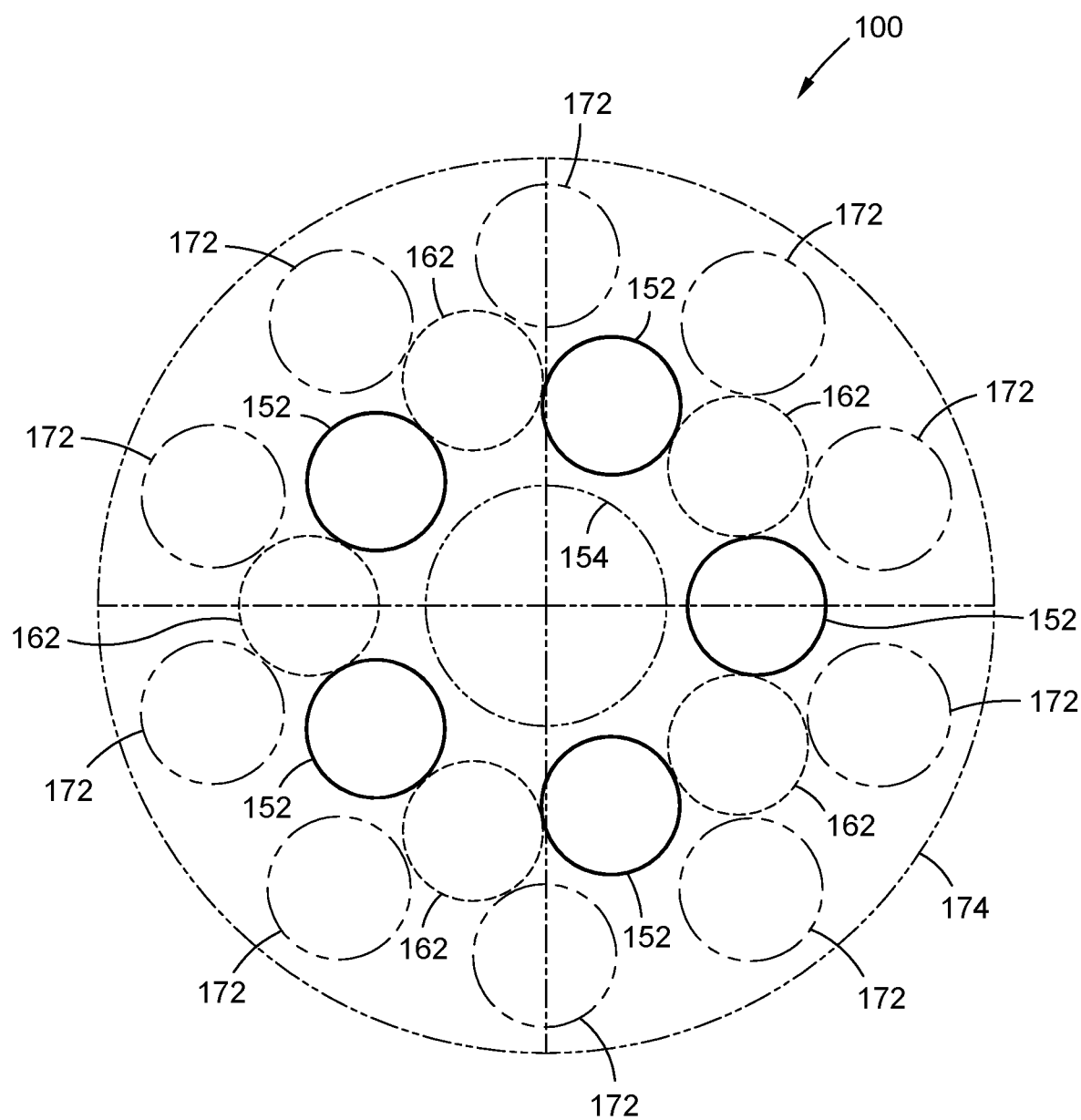
Figure 13D:
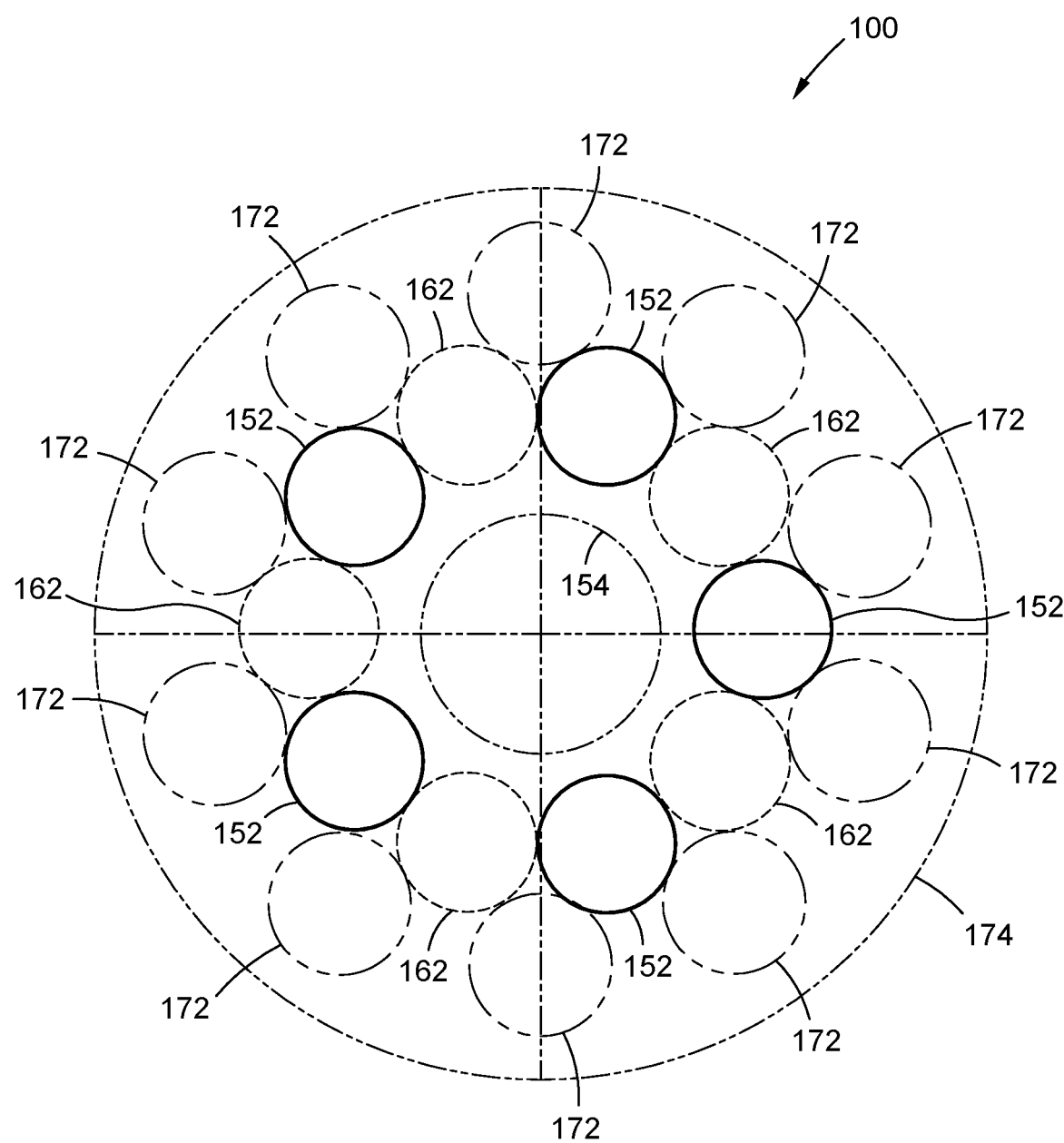
Figure 13E:
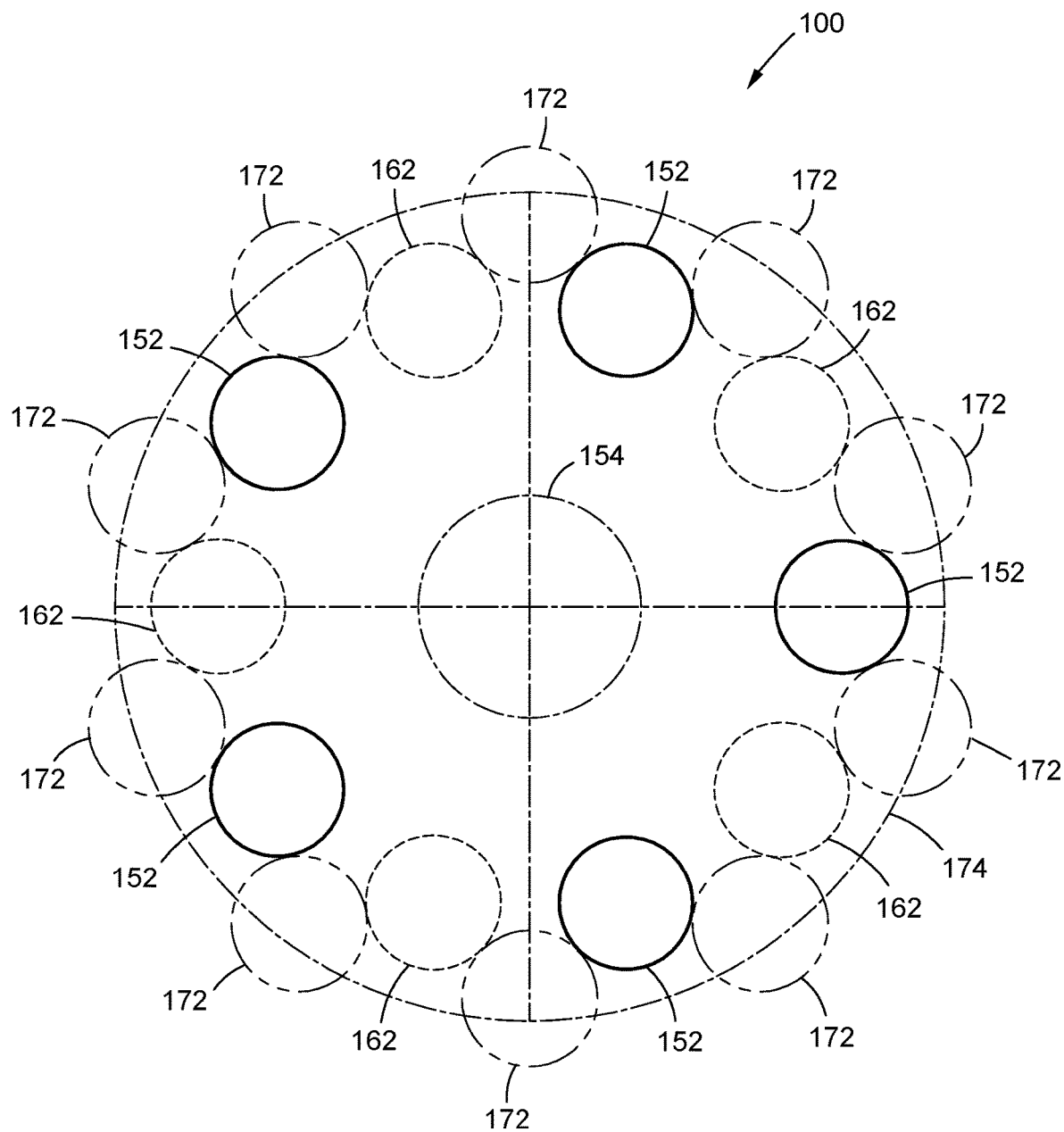
Figure 13F:
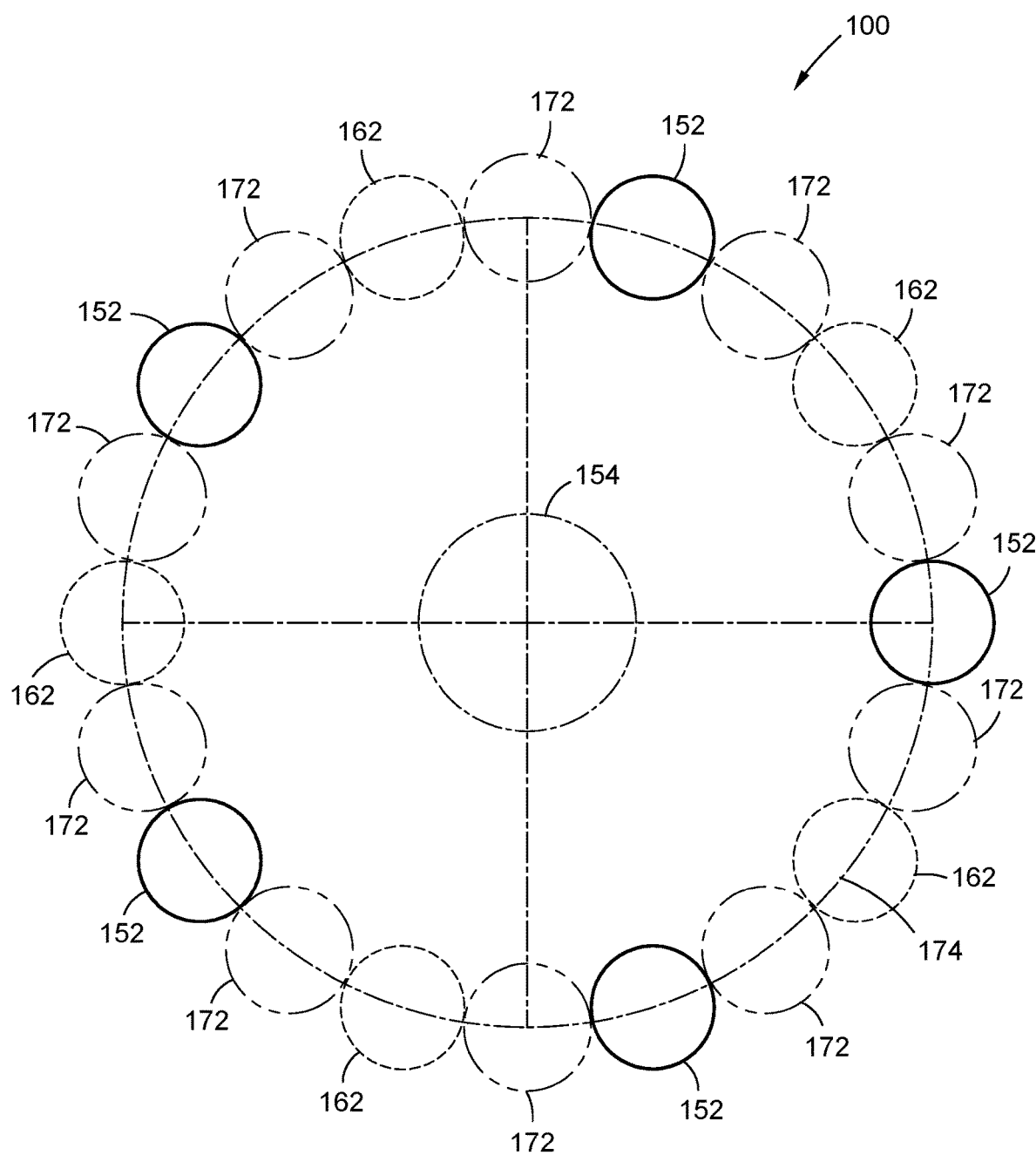

Referring to FIGS. 13A-13F, shown is an example of an inspection system 100 in which, prior to radial translation of the elongated light elements, the rounded arrays are arranged in a manner similar to the above-described arrangement shown in FIGS. 10A, 11A, and 12A. In FIGS. 13A-13F, the light-element-moving system 200 is configured to maintain contiguity of each of the second elongated light elements 162 with a pair of the third elongated light elements 172, and maintain contiguity of each of the second elongated light elements 162 with a pair of the first elongated light elements 152 at all times while radially translating the first, second, and third elongated light elements 152, 162, 172 to the third radial location 174. In this regard, during radial translation toward the third radial location 174, the light-element-moving system 200 is configured to radially translate the second and third elongated light elements 172 both radially inwardly and radially outwardly as needed to maintain constant contiguity of the elongated light elements. For example, FIGS. 13A-13C illustrate radially outward movement of the first, second, and third elongated light elements 152, 162, 172. However, FIGS. 13C-13D illustrate temporary radially inward movement of the second and third elongated light elements 172 while the first elongated light elements 152 continue moving radially outwardly. FIGS. 13D-13E illustrate radially outward movement of the first, second, and third elongated light elements 152, 162, 172 to the third radial location 174. At the third radial location 174, the first, second, and third elongated light elements 152, 162, 172 are contiguous as shown in FIG. 13F. By continuously maintaining contiguity of the elongated light elements, a homogenously illuminated background is provided for backlighting the transparency 400.

The presently-disclosed examples of the inspection system 100 are described in the context of recording images of the transparency 400 as the elongated light elements of at least one radial array are translated in a radially outward direction. For the example of an inspection system (not shown) containing only a first rounded array 150 of first elongated light elements 152 and a second rounded array 160 of second elongated light elements 162 (i.e., no third radial array), the first elongated light elements 152 may be translated in a radially outward direction from the first radial location 154 to the second radial location 164 as the image recording device 300 records images of the transparency 400. However, in any one of the examples disclosed herein, the elongated light elements may be translated in a radially inward direction during the recording of images of the transparency 400. For example, in an inspection system having only a first rounded array 150 of first elongated light elements 152 and a second rounded array 160 of second elongated light elements 162, the first elongated light elements 152 and the second elongated light elements 162 may each initially (e.g., prior to radial translation) be positioned at the second radial location, and the first elongated light elements 152 may be translated in a radially inward direction from the second radial location 164 to the first radial location 154 as the image recording device 300 records images of the transparency 400.

FIGS. 14A-14D are collectively a block diagram of a method 500 of detecting optical defects in a transparency 400. Step 502 of the method 500 comprises emitting light from a plurality of first elongated light elements 152 oriented parallel to each other and arranged in a first rounded array 150 and positionable at a first radial location 154. Prior to radial translation, the first elongated light elements 152 may be contiguous with each other at the first radial location 154, as shown in the examples of FIGS. 8A-13F. However, in other examples such as in FIGS. 1-2, the first elongated light elements 152 may be non-contiguous with each other prior to radial translation.

Step 504 of the method 500 includes emitting light from a plurality of second elongated light elements 162 oriented parallel to each other and arranged in a second rounded array 160 concentric with the first rounded array 150 and positionable at a second radial location 164 in which the second elongated light elements 162 are circumferentially spaced apart from each other. As described above, each light element gap 184 between adjacent pairs of the second elongated light elements 162 may be sized to receive one of the first elongated light elements 152. In this regard, each light element gap 184 is sized to allow a first elongated light element 152 to pass through the light element gap 184 without contacting either of the second elongated light elements 162 defining the light element gap 184.

In addition to emitting light from the first and second elongated light elements 152, 162, the method 500 may further comprise step 506 of emitting light from a plurality of third elongated light elements 172 oriented parallel to each other and arranged in a third rounded array 170 concentric with the first and second rounded array 150, 160 and positionable at a third radial location 174 in which the third elongated light elements 172 are circumferentially spaced apart from each other to define a plurality of light element gaps 184 respectively between adjacent pairs of the third elongated light elements 172. As described above, the inspection system 100 may include any number of rounded arrays of elongated light elements, any one or more of which may be radially translated during backlighting of the transparency 400.

The first, second, and third elongated light elements 152, 162, 172 may each be arranged in an arc-shaped array 120 as described above and shown in FIGS. 1-3 and 7-8C, or in a ring-shaped array 122 as described above and shown in FIGS. 9A-13F. The first, second, and third elongated light elements 152, 162, 172 may be arranged in a rounded array shaped complementary to the cross-sectional shape of the transparency 400, as described above. For example, in FIGS. 1-3, the first, second, and third rounded arrays 150, 160, 170 are arranged in an arc-shaped array 120 (FIGS. 1-2) for backlighting the aircraft windshield 402 which has an arc-shaped cross section.

Step 514 of the method 500 includes radially translating, using a light-element-moving system 200, at least the first elongated light elements 152 between the first radial location 154 and the second radial location 164. As described above, the first elongated light elements 152 may be translated along a radial direction from the first radial location 154 toward the second radial location 164 until each of the first elongated light elements 152 is positioned within one of the light element gaps 184 between adjacent pairs of the second elongated light elements 162 while the first and second elongated light elements 152, 162 backlight the transparency 400, as shown in the example of FIGS. 8A-8C. In this regard, step 514 of radially translating at least the first elongated light elements 152 may comprise step 526 of radially translating each of the first elongated light elements 152 into a light element gap 184 of the second rounded array 160 having a gap width 186 that is substantially equivalent to the light element width 182 of the first elongated light element 152. At the completion of step 526, the second radial location 164 may include contiguous and alternating first and second elongated light elements 152, 162. For inspection systems 100 having a third rounded array 170 positionable at a third radial location 174, the method 500 may include step 524 of radially translating the first and second elongated light elements 152, 162 toward the third radial location 174. For examples in which the third rounded array 170 is initially positioned at a radial location between the second radial location 164 and third radial location 174, the method may include radially translating the third elongated light elements 172 toward the third radial location 174 in addition to radially translating the first and second elongated light elements 152, 162 toward the third radial location 174, as shown in the below-described examples of FIGS. 10A-13F.

Referring briefly to FIG. 7, the method may optionally comprise the step 548 of reflecting, using a reflector 112 positioned on a side of the elongated light elements opposite the diffuser 116, the light emitted by the elongated light elements back toward the transparency 400. As mentioned above, the outer wall 110 of the housing 102 may be configured as a reflector 112 for reflecting light from the elongated light elements as a means to increase the intensity and/or uniformity of the backlighting of the transparency 400 and/or to reduce or eliminate the occurrence of shadows in the backlighting of the transparency 400. Alternatively or additionally, the method may optionally comprise the step 550 of diffusing, using a diffuser 116 located between the first rounded array 150 and the transparency 400, the light emitted by the first and second elongated light elements 152, 162. As described above, the inner wall 114 of the housing 102 may be configured as a diffuser 116 which may be contoured complementary to the transparency 400. The diffuser 116 may reduce the occurrence of bright spots in the lighting emitted by the elongated light elements and may thereby increase the homogeneity of the background against which the transparency 400 is imaged by the image recording device 300.

Step 516 of the method 500 includes recording, using at least one image recording device 300 positionable on a side of the transparency 400 opposite the rounded arrays, images of the transparency 400 during translation of the first elongated light elements 152 from the first radial location 154 to the second radial location 164 while backlighting the transparency 400 using the light emitted from the first and second elongated light elements 152, 162. As described above, the image recording device 300 may be provided in any one of a variety of configurations. For example, the above-described example of FIGS. 1-4 shows the image recording device 300 configured as a vertical stack of statically-positioned areal cameras 302. For examples of the inspection system 100 having a third rounded array 170 as shown in FIGS. 1-4 and 8A-13F, step 516 of recording images may comprise step 542 of recording images of the transparency 400 during the radial translation of at least the first and second elongated light elements 152, 162 while backlighting the transparency 400 using the first, second, and third elongated light elements 152, 162, 172. The recording of images may comprise step 544 of recording images of an aircraft windshield 402, an aircraft canopy (not shown), an aircraft passenger window (not shown), of any other type of transparency 400, without limitation.

As an alternative to recording images using areal cameras 302, step 516 of recording images of the transparency 400 may comprise rotating a panoramic camera 306 (FIG. 7) about an axis of rotation 308 (FIG. 7) while recording images of the transparency 400. The panoramic camera 306 may record images of the transparency 400 prior to, during, and after the elongated light elements are radially translated. For example, step 516 may optionally comprise rotating the panoramic camera 306 while recording images of the transparency 400 when the first elongated light elements 152 are at the first radial location 154. Step 516 may also comprise rotating the panoramic camera 306 while recording images of the transparency 400 when the first elongated light elements 152 are at one or more intermediate radial locations (not shown) during translation between the first radial location 154 and the second radial location 164. Additionally, step 516 may optionally comprise rotating the panoramic camera 306 while recording images of the transparency 400 after the first elongated light elements 152 have arrived at the light element gaps 184 between adjacent pairs of the second elongated light elements 162 at the second radial location 164. For examples of the inspection system 100 having additional rounded arrays of elongated light elements such as a third rounded array 170, step 516 may comprise rotating the panoramic camera 306 during and/or after at least the first and second elongated light elements 152, 162 have arrived at the light element gaps 184 between adjacent pairs of the third elongated light elements 172 at the third radial location 174.

Regardless of the configuration of the image recording device 300, the method 500 may optionally include recording one or more first images of the transparency 400 when the first elongated light elements 152 are at the first radial location 154 prior to radial translation. The method 500 includes recording images of the transparency 400 during radial translation of the first elongated light elements 152 from the first radial location 154 to the second radial location 164, and may include recording images of the transparency 400 when the first elongated light elements 152 are located within the light element gaps 184 between adjacent pairs of the second elongated light elements 162 at the second radial location 164. During radial translation, the image recording device 300 may record images of the transparency 400 at predetermined time intervals such as at a predetermined number of frames per second. In some examples, the image recording device 300 may be configured as one or more video cameras for continuously recording video of the transparency 400 during radial translation, and thereby generating an essentially continuous stream of images of the transparency 400. Step 516 of recording images of the transparency 400 may comprise recording a vertical field of view 416 encompassing the viewing portion 408 of the transparency 400 and including the upper and lower edge 410, 412, as shown in FIG. 4.

Step 518 of the method 500 includes analyzing, using a processor 220 (FIG. 4), the images recorded during radial translation of at least the first elongated light elements 152 for detecting optical defects in the transparency 400. As described above, the processor 220 may analyze the images by comparing the images to a baseline image of the transparency 400. As an alternative to or in addition to comparing the images to a baseline image, step 518 may comprise step 546 of comparing (via the processor 220) images of the transparency 400 recorded at different points in time during radial translation of the elongated light elements. In this regard, the processor 220 may compare the images of the transparency 400 recorded prior to radial translation of the elongated light elements to images recorded when the elongated light elements are at an intermediate location during radial translation. For example, the processor 220 may compare images of the transparency 400 recorded when at least the first elongated light elements 152 are at different locations during radial translation of the first elongated light elements 152, such as comparing images recorded with the first elongated light elements 152 are at the first radial location 154 to images recorded when the first elongated light elements 152 are at the second radial location 164, and which may also optionally be compared to images recorded when the first and second elongated light elements 152, 162 are at the third radial location 174. However, the processor 220 may compare images of the transparency 400 recorded at numerous intermediate locations of the elongated light elements during radial translation. Alternatively or additionally, the processor 220 may compare images recorded during radial translation of the elongated light elements to images of a defect-free transparency sample, as described above.

Referring now to FIGS. 8A-13F, shown are several examples of different movement schemes for radially translating the elongated light elements during backlighting of the transparency 400 while recording images of the transparency 400 using an image recording device 300. FIGS. 8A-9C show an example in which, prior to radially translating the elongated light elements, the first rounded array 150 of first elongated light elements 152 is positioned at the first radial location 154, and the second rounded array 160 of second elongated light elements 162 is positioned at the second radial location 164. The third rounded array 170 of third elongated light elements 172 are statically (e.g., non-movably) positioned at the third radial location 174, and the third elongated light elements 172 are non-contiguous with (e.g., are non-contacting) the second elongated light elements 162. In FIGS. 8A-9C, step 514 of radially translating at least the first elongated light elements 152 may comprise step 526 of radially translating the first elongated light elements 152 from the first radial location 154 to the second radial location 164 until each of the first elongated light elements 152 is positioned within one of the light element gaps 184, followed by step 530 of radially translating the first and second elongated light elements 152, 162 from the second radial location 164 to the third radial location 174 until each of the first and second elongated light elements 152, 162 is positioned within one of the light element gaps 184.

Referring to As shown in the above-described FIGS. 10A-10D, prior to radially translating the elongated light elements, the method 500 may include step 508 of positioning the first elongated light elements 152 at the first radial location 154, step 510 of positioning the second elongated light elements 162 at a radial location outboard of the first radial location 154, and step 512 of positioning the third elongated light elements 172 at a radial location outboard of the second elongated light elements 162. For example, step 510 may comprise step 520 of positioning the second elongated light elements at a radial location at which each of the second elongated light elements is contiguous with a pair of the first elongated light elements. Step 512 may comprise step 522 of positioning the third elongated light elements at a radial location at which each of the second elongated light elements 162 is contiguous with a pair of the third elongated light elements 172. During radial translation of the elongated light elements in FIGS. 10A-10D, the method 500 may comprise step 528 of radially translating the first elongated light elements 152 from the first radial location 154 to the second radial location 164 (FIGS. 10A-10B) at which each of the first elongated light elements 152 is positioned within one of the light element gaps 184, and each of the third elongated light elements 172 is contiguous with one of the first elongated light elements 152 and one of the second elongated light elements 162 (FIG. 10B), followed by step 532 of radially translating the first, second, and third elongated light elements 152, 162, 172 (FIGS. 10B-10D) toward the third radial location 174 until each of the first and second elongated light elements 152, 162 is positioned within one of the light element gaps 184 (FIG. 10D).

Figure 11E:
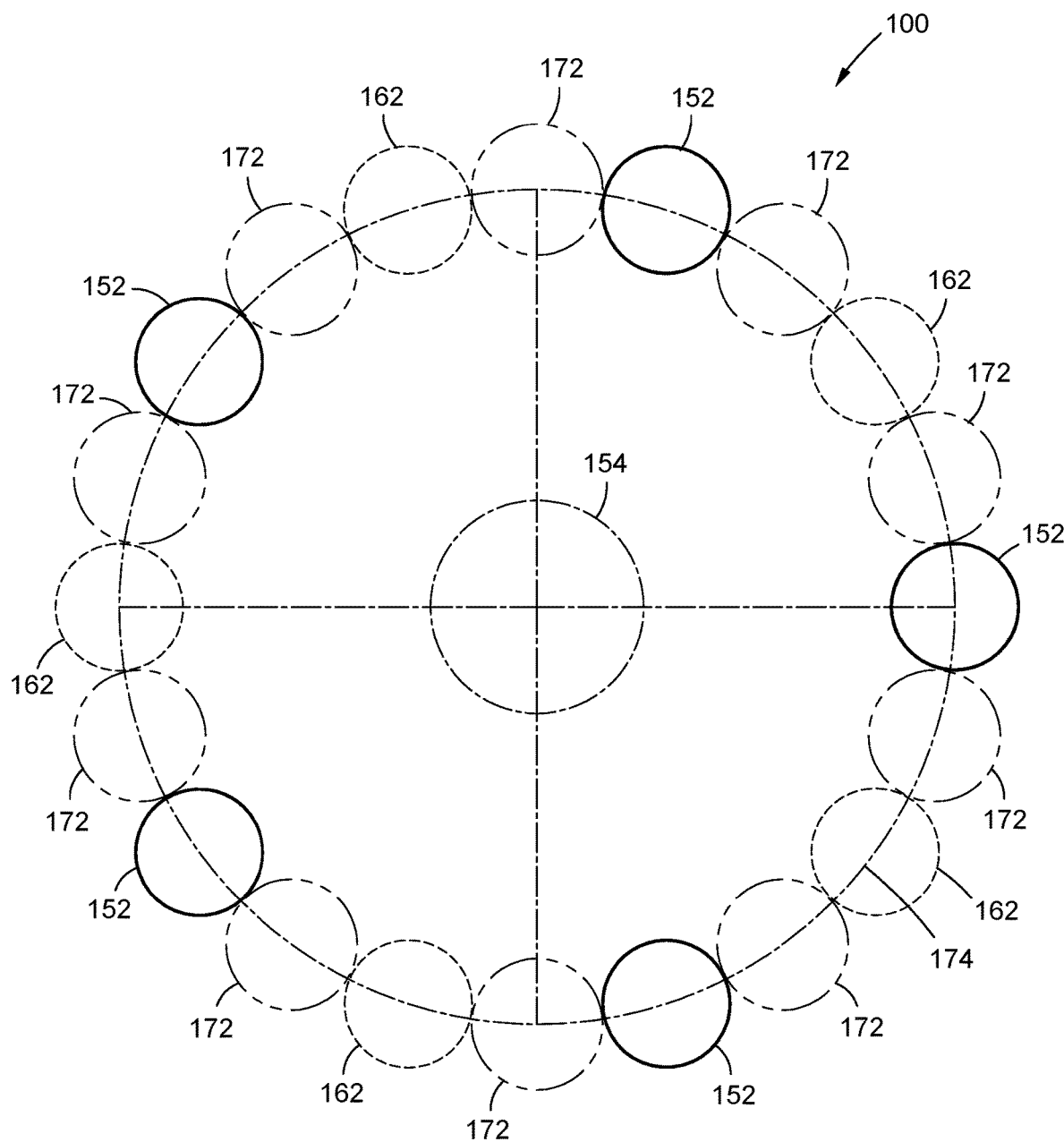

Referring to FIGS. 11A-11E, prior to radial translation (FIG. 11A), the arrangement of the first, second, and third elongated light elements 152, 162, 172 is similar to the above-described arrangement of FIGS. 10A-10D. During radial translation of the elongated light elements, the method 500 may comprise step 534 of radially translating the first, second, and third elongated light elements 152, 162, 172 at the same velocity (FIGS. 11B-11E) toward the third radial location 174 until each of the first and second elongated light elements 152, 162 is positioned within one of the light element gaps 184 between adjacent pairs of the third elongated light elements 172 (FIG. 11E). As mentioned above, the first, second, and third elongated light elements 152, 162, 172 may start moving at the same time (FIGS. 11A-11B) and may be translated at the same velocity to arrive at the third radial location 174 at different times. The processor 220 may control the actuators 206 to cause radial translation of the first and second elongated light elements 152, 162 at the same velocity.

Figure 12E:
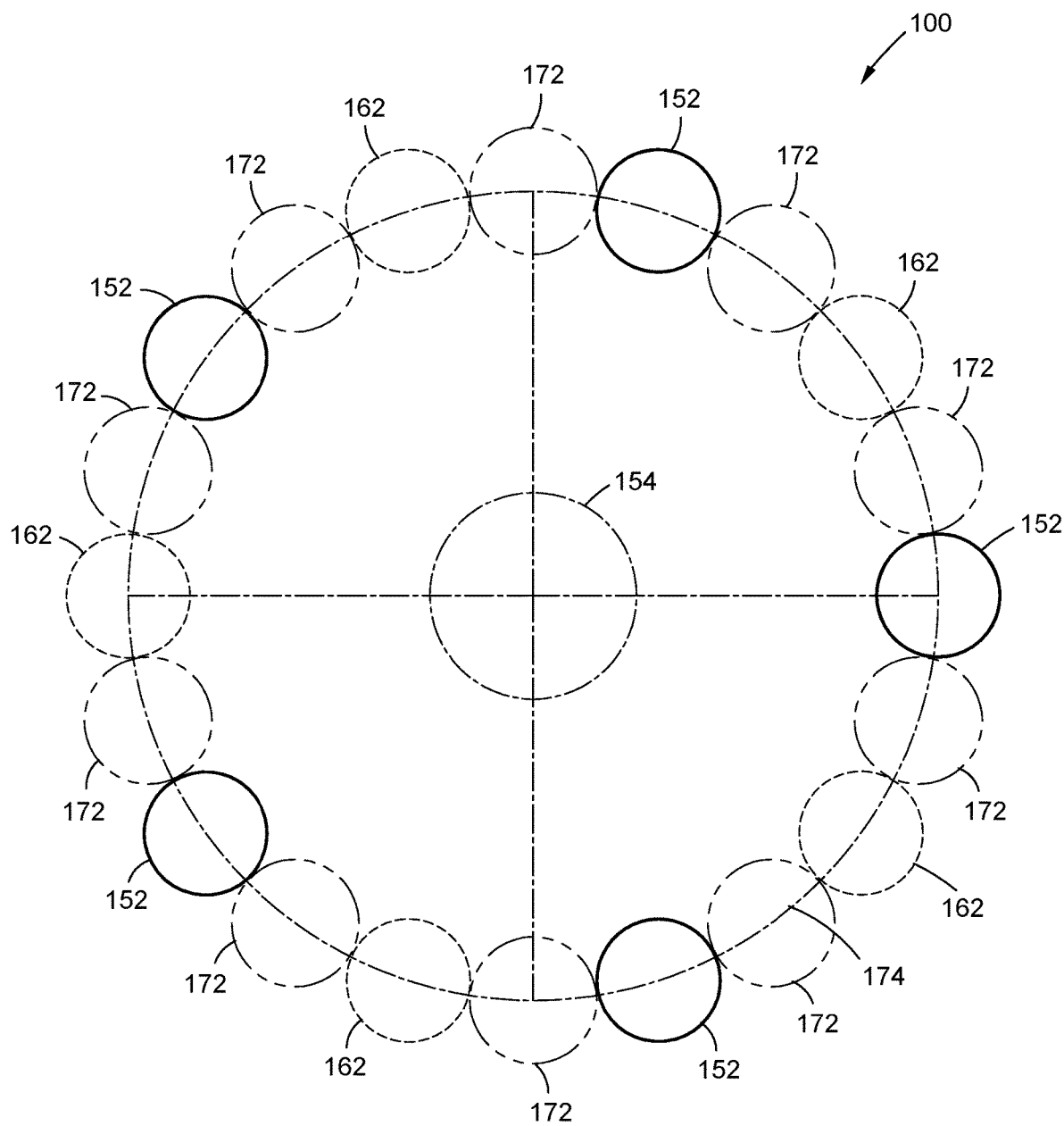

Referring to FIGS. 12A-12E, prior to radial translation (FIG. 12A), the arrangement of the first, second, and third elongated light elements 152, 162, 172 is similar to the above-described arrangement of FIGS. 10A-11E. During radial translation of the elongated light elements, the method 500 may comprise step 536 of radially translating the first, second, and third elongated light elements 152, 162, 172 at different velocities (FIGS. 12B-12E) toward the third radial location 174 in a manner such that the first, second, and third elongated light elements 152, 162, 172 arrive at the third radial location 174 at the same time, and each of the first and second elongated light elements 152, 162 is positioned within one of the light element gaps 184 (FIG. 12E). The first, second, and third elongated light elements 152, 162, 172 may start moving at the same time (FIGS. 12A-12B) and may be translated at different velocities to arrive at the third radial location 174 at the same time.

Referring to FIGS. 13A-13F, prior to radial translation (FIG. 13A), the arrangement of the first, second, and third elongated light elements 152, 162, 172 is similar to the above-described arrangement of FIGS. 10A-12E. During radial translation of the elongated light elements, the method 500 may comprise step 538 of radially translating the first, second, and third elongated light elements 152, 162, 172 toward the third radial location 174 at which each of the first and second elongated light elements 152, 162 is positionable within one of the light element gaps 184, and step 540 of maintaining contiguity (FIGS. 13B-13F) of each of the second elongated light elements 162 with a pair of the third elongated light elements 172 and with a pair of the first elongated light elements 152 while radially translating the first, second, and third elongated light elements 152, 162, 172 to the third radial location 174. The first, second, and third elongated light elements 152, 162, 172 may arrive at the third radial location 174 at the same time. In order to maintain contiguity, the first, second, and third elongated light elements 152, 162, 172 may initially be translated radially outwardly as shown in FIGS. 13A-13C, and the second and third elongated light elements 172 may temporarily be translated radially inward while the first elongated light elements 152 are translated radially outwardly as shown in FIGS. 13C-13D, after which the first, second, and third elongated light elements 152, 162, 172 may be translated radially outwardly until arriving at the third radial location 174, as shown in FIGS. 13D-13F. As indicated above, continuously maintaining contiguity of the elongated light elements during radial translation may ensure uniformity of backlighting of the transparency 400 with no shadows or bright spots.

As may be appreciated, the process of radially translating the elongated light elements may be performed using any number of different movement schemes, and is not limited to the movement schemes described herein. Furthermore, as indicated above, the presently-disclosed method of inspecting a transparency 400 is not limited to recording images during radial translation of first, second, and/or third rounded arrays 150, 160, 170 of elongated light elements, but may be performed by radially translating any number of rounded arrays including radially translating a single rounded array of elongated light elements, or radially translating three or more rounded arrays of elongated light elements.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. An inspection system for detecting optical defects in a transparency, comprising:
    a plurality of rounded arrays of elongated light elements, including:
        a first rounded array of first elongated light elements positionable at a first radial location having an array center defining an array axis, the first elongated light elements oriented generally parallel to each other and to the array axis;
        a second rounded array of second elongated light elements concentric with the first rounded array and positionable radially outboard of the first elongated light elements at a radial location where the second elongated light elements are circumferentially spaced apart from each other to define a plurality of light element gaps respectively between adjacent pairs of the second elongated light elements, each one of the light element gaps being radially aligned with one of the first elongated light elements, the second elongated light elements oriented parallel to each other;
    a light-element-moving system configured to radially translate at least the first elongated light elements;
    an image recording device positionable on a side of the transparency opposite the rounded arrays and configured to record images of the transparency during radial translation of the elongated light elements while the elongated light elements backlight the transparency; and
    a processor configured to analyze the images recorded during radial translation of at least the first elongated light elements, and detect optical defects in the transparency based on analysis of the images.

2. The inspection system of claim 1, wherein the plurality of rounded arrays further include:
    a third rounded array of third elongated light elements positionable radially outboard of and concentric with the first rounded array and second rounded array and circumferentially spaced apart from each other to define a plurality of the light element gaps respectively between adjacent pairs of the third elongated light elements, the third elongated light elements oriented parallel to each other and to the array axis; and
    the light-element-moving system configured to radially translate at least the first and second elongated light elements until each of the first and second elongated light elements is positioned within one of the light element gaps of the third elongated light elements.

3. The inspection system of claim 2, wherein:
    the third rounded array of the third elongated light elements are statically positioned at a third radial location; and
    the light-element-moving system configured to radially translate the first elongated light elements from the first radial location to the second radial location until each of the first elongated light elements is positioned within one of the light element gaps between adjacent ones of the second elongated light elements and is non-contiguous with the third elongated light elements, after which the light-element-moving system is configured to simultaneously translate the first and second elongated light elements from the second radial location to the third radial location until each of the first and second elongated light elements is positioned within one of the light element gaps between adjacent ones of the third elongated light elements.

4. The inspection system of claim 2, wherein prior to radial translation of the first and second elongated light elements:
    the second rounded array of the second elongated light elements are positionable at a radial location at which each of the second elongated light elements is contiguous with a pair of the first elongated light elements; and
    the third rounded array of the third elongated light elements are positionable at a radial location at which each of the second elongated light elements is contiguous with a pair of the third elongated light elements.

5. The inspection system of claim 4, wherein:
    the light-element-moving system is configured to radially translate the first elongated light elements from the first radial location to the second radial location until each of the first elongated light elements is positioned within one of the light element gaps between adjacent ones of the second elongated light elements and each of the third elongated light elements is contiguous with one of the first elongated light elements and one of the second elongated light elements, after which the light-element-moving system is configured to radially translate the first, second, and third elongated light elements at a same velocity toward a third radial location until each of the first and second elongated light elements is positioned within one of the light element gaps between adjacent ones of the third elongated light elements, the third elongated light elements arriving at the third radial location prior to the first and second elongated light elements.

6. The inspection system of claim 4, wherein:
the light-element-moving system is configured to simultaneously radially translate the first, second, and third elongated light elements at a same velocity toward a third radial location until each of the first and second elongated light elements is positioned within one of the light element gaps between adjacent ones of the third elongated light elements, the third elongated light elements arriving at the third radial location prior to the first and second elongated light elements.

7. The inspection system of claim 4, wherein:
the light-element-moving system is configured to simultaneously radially translate the first, second, and third elongated light elements at different velocities toward a third radial location in a manner such that the first, second, and third elongated light elements arrive at third radial location at the same time and each of the first and second elongated light elements is positioned within one of the light element gaps between adjacent ones of the third elongated light elements.

8. The inspection system of claim 4, wherein:
the light-element-moving system is configured to radially translate the first, second, and third elongated light elements toward a third radial location at which each of the first and second elongated light elements is positioned within one of the light element gaps between adjacent ones of the third elongated light elements; and
the light-element-moving system configured to maintain contiguity of each of the second elongated light elements with a pair of the third elongated light elements and with a pair of the first elongated light elements while radially translating the first, second, and third elongated light elements to the third radial location.

9. The system of claim 1, wherein:
the first elongated light elements each have a light element width; and
the light element gap between each of adjacent pairs of the second elongated light elements having a gap width that is substantially equivalent to the light element width.

10. The system of claim 1, wherein the first rounded array and the second rounded array are each configured as one of:
an arc-shaped array including a semi-circular array, a semi-elliptical array, or a rounded semi-elliptical array;
a ring-shaped array including a circular array, an elliptical array, or a rounded elliptical array.

11. The system of claim 1, wherein:
the elongated light elements are configured as at least one of fluorescent light bulbs, incandescent light bulbs, halogen light bulbs, and light-emitting diodes.

12. The system of claim 1, further comprising:
a diffuser positionable between the first rounded array and the transparency, and configured to substantially uniformly diffuse light emitted by the elongated light elements.

13. The system of claim 1, further comprising:
a reflector positioned radially outboard of the elongated light elements, and configured to reflect light emitted by the elongated light elements.

14. The inspection system of claim 1, wherein the image recording device is configured as one of:
a panoramic camera rotatable about an axis of rotation for recording a horizontal field of view of the transparency;
a plurality of areal cameras arranged in a vertical stack and each oriented at a different circumferential angle for recording a different portion of the horizontal field of view of the transparency.

15. An inspection system for detecting optical defects in a transparency, comprising:
a plurality of rounded arrays of elongated light elements, including:
a first rounded array of first elongated light elements positionable at a first radial location having an array center defining an array axis, the first elongated light elements oriented generally parallel to each other and to the array axis;
a second rounded array of second elongated light elements concentric with the first rounded array and positionable radially outboard of the first elongated light elements at a radial location where the second elongated light elements are circumferentially spaced apart from each other to define a plurality of light element gaps respectively between adjacent pairs of the second elongated light elements, each one of the light element gaps being radially aligned with one of the first elongated light elements, the second elongated light elements oriented parallel to each other;
a light-element-moving system configured to radially translate at least the first elongated light elements;
a fixture configured to support at least one image recording device positionable on a side of the transparency opposite the rounded arrays and configured to record images of the transparency during radial translation of the elongated light elements while the elongated light elements backlight the transparency; and
a processor configured to analyze the images recorded during radial translation of at least the first elongated light elements, and detect optical defects in the transparency based on analysis of the images.

16. A method of detecting optical defects in a transparency, comprising:
emitting light from a plurality of first elongated light elements oriented parallel to each other and arranged in a first rounded array and positionable at a first radial location;
emitting light from a plurality of second elongated light elements oriented parallel to each other and arranged in a second rounded array concentric with the first rounded array and positionable at a second radial location in which the second elongated light elements are circumferentially spaced apart from each other to define a plurality of light element gaps respectively between adjacent pairs of the second elongated light elements;
radially translating at least the first elongated light elements between the first radial location and the second radial location;
recording, using an image recording device positionable on a side of the transparency opposite the rounded arrays, images of the transparency during translation of at least the first elongated light elements while uniformly backlighting the transparency using the light emitted from the first and second elongated light elements; and
analyzing, using a processor, the images recorded during radial translation of at least the first elongated light elements for detecting optical defects in the transparency.

17. The method of claim 16, further comprising:
emitting light from a plurality of third elongated light elements oriented parallel to each other and arranged in a third rounded array concentric with the first and second rounded array and positionable at a third radial location in which the third elongated light elements are circumferentially spaced apart from each other to define a plurality of light element gaps respectively between adjacent pairs of the third elongated light elements;
wherein radially translating the first elongated light elements, and recording images of the transparency respectively comprise:
radially translating the first and second elongated light elements toward the third radial location; and
recording images of the transparency during the radial translation of at least the first and second elongated light elements while backlighting the transparency using the first, second, and third elongated light elements.

18. The method of claim 17, wherein the third rounded array of the third elongated light elements are statically positioned at the third radial location at which the third elongated light elements are non-contiguous with the second elongated light elements and the third elongated light elements define a plurality of light element gaps, and wherein radially translating at least the first elongated light elements comprises sequentially performing the following:
radially translating the first elongated light elements from the first radial location to the second radial location until each of the first elongated light elements is positioned within one of the light element gaps between adjacent ones of the second elongated light elements; and
radially translating the first and second elongated light elements from the second radial location to the third radial location until each of the first and second elongated light elements is positioned within one of the light element gaps between adjacent ones of the third elongated light elements.

19. The method of claim 17, wherein prior to radially translating the first elongated light elements, the method includes:
positioning the second elongated light elements at a radial location at which each of the second elongated light elements is contiguous with a pair of the first elongated light elements; and
positioning the third elongated light elements at a radial location at which each of the second elongated light elements is contiguous with a pair of the third elongated light elements.

20. The method of claim 19, wherein radially translating at least the first elongated light elements comprises sequentially performing the following:
radially translating the first elongated light elements from the first radial location to the second radial location at which each of the first elongated light elements is positioned within one of the light element gaps between adjacent ones of the second elongated light elements, and each of the third elongated light elements is contiguous with one of the first elongated light elements and one of the second elongated light elements; and
radially translating the first, second, and third elongated light elements toward the third radial location until each of the first and second elongated light elements is positioned within one of the light element gaps between adjacent ones of the third elongated light elements.

21. The method of claim 20, wherein radially translating the first, second, and third elongated light elements comprises:
radially translating the first, second, and third elongated light elements at a same speed toward the third radial location until each of the first and second elongated light elements is positioned within one of the light element gaps between adjacent ones of the third elongated light elements, the third elongated light elements arriving at the third radial location prior to the first and second elongated light elements.

22. The method of claim 19, wherein radially translating the first, second, and third elongated light elements comprises:
radially translating the first, second, and third elongated light elements at different velocities toward the third radial location in a manner such that the first, second, and third elongated light elements arrive at the third radial location at the same time and each of the first and second elongated light elements is positioned within one of the light element gaps between adjacent ones of the third elongated light elements.

23. The method of claim 19, wherein radially translating the first, second, and third elongated light elements comprises:
radially translating the first, second, and third elongated light elements toward the third radial location at which each of the first and second elongated light elements is positionable within one of the light element gaps between adjacent ones of the third elongated light elements; and
maintaining contiguity of each of the second elongated light elements with a pair of the third elongated light elements and with a pair of the first elongated light elements while radially translating the first, second, and third elongated light elements to the third radial location.

24. The method of claim 16, wherein:
each of the light element gaps between adjacent pairs of the second elongated light elements has a gap width that is substantially equivalent to a light element width of each of the first elongated light elements such that when the first elongated light elements are at the second radial location, the second radial location includes contiguous and alternating first and second elongated light elements.

25. The method of claim 16, wherein recording images of the transparency during translation of at least the first elongated light elements comprises:
recording images of one of an aircraft windshield, an aircraft canopy, and an aircraft passenger window.

26. The method of claim 16, wherein analyzing the images comprises:
comparing images of the transparency recorded when at least the first elongated light elements are at different locations during radial translation of the first elongated light elements.

* * * * *